(12) United States Patent
Macmillan et al.

(10) Patent No.: US 10,148,939 B2
(45) Date of Patent: Dec. 4, 2018

(54) MAPPING OF SPHERICAL IMAGE DATA INTO RECTANGULAR FACES FOR TRANSPORT AND DECODING ACROSS NETWORKS

(71) Applicant: GoPro, Inc., San Mateo, CA (US)

(72) Inventors: Timothy Macmillan, La Honda, CA (US); Adeel Abbas, Carlsbad, CA (US)

(73) Assignee: GOPRO, INC., San Mateo, CA (US)

( * ) Notice: Subject to any disclaimer, the term of this patent is extended or adjusted under 35 U.S.C. 154(b) by 58 days.

(21) Appl. No.: 15/357,963

(22) Filed: Nov. 21, 2016

(65) Prior Publication Data

US 2018/0027178 A1 Jan. 25, 2018

Related U.S. Application Data

(60) Provisional application No. 62/363,926, filed on Jul. 19, 2016.

(51) Int. Cl.
*H04N 13/243* (2018.01)
*H04N 5/232* (2006.01)
(Continued)

(52) U.S. Cl.
CPC ......... *H04N 13/243* (2018.05); *G06K 9/4609* (2013.01); *G06K 9/52* (2013.01); *G06K 9/6201* (2013.01); *G06K 9/6212* (2013.01); *G06T 3/0043* (2013.01); *G06T 3/0068* (2013.01); *G06T 3/20* (2013.01); *G06T 7/0002* (2013.01);
(Continued)

(58) Field of Classification Search
None
See application file for complete search history.

(56) References Cited

U.S. PATENT DOCUMENTS 9,330,436 B2 5/2016 MacMillan et al.
9,571,759 B1 2/2017 Adsumilli et al.
(Continued)

OTHER PUBLICATIONS

U.S. Appl. No. 15/234,869, filed with the U.S. Patent and Trademark Office on Aug. 11, 2016.
(Continued)

*Primary Examiner* — Eileen M Adams
(74) *Attorney, Agent, or Firm* — Gazdzinski & Associates, PC

(57) ABSTRACT

A system captures a first hemispherical image and a second hemispherical image, each hemispherical image including an overlap portion, the overlap portions capturing a same field of view, the two hemispherical images collectively comprising a spherical FOV and separated along a longitudinal plane. The system maps a modified first hemispherical image to a first portion of the 2D projection of a cubic image, the modified first hemispherical image including a non-overlap portion of the first hemispherical image, and maps a modified second hemispherical image to a second portion of the 2D projection of the cubic image, the modified second hemispherical image also including a non-overlap portion. The system maps the overlap portions of the first hemispherical image and the second hemispherical image to the 2D projection of the cubic image, and encodes the 2D projection of the cubic image to generate an encoded image representative of the spherical FOV.

20 Claims, 15 Drawing Sheets

(51) Int. Cl.

| | | |
|---|---|---|
| *H04N 5/265* | (2006.01) | |
| *H04N 19/136* | (2014.01) | |
| *H04N 19/44* | (2014.01) | |
| *G06K 9/46* | (2006.01) | |
| *G06K 9/52* | (2006.01) | |
| *G06K 9/62* | (2006.01) | |
| *G06T 3/00* | (2006.01) | |
| *G06T 3/20* | (2006.01) | |
| *G06T 7/00* | (2017.01) | |
| *G06T 11/60* | (2006.01) | |
| *G06T 15/20* | (2011.01) | |
| *H04N 13/302* | (2018.01) | |
| *H04N 13/344* | (2018.01) | |
| *H04N 13/10* | (2018.01) | |
| *H04N 13/334* | (2018.01) | |
| *H04N 13/282* | (2018.01) | |
| *H04N 13/161* | (2018.01) | |

(52) U.S. Cl.
CPC .......... *G06T 7/0038* (2013.01); *G06T 7/0042* (2013.01); *G06T 7/0075* (2013.01); *G06T 11/60* (2013.01); *G06T 15/20* (2013.01); *H04N 5/23238* (2013.01); *H04N 5/265* (2013.01); *H04N 13/10* (2018.05); *H04N 13/282* (2018.05); *H04N 13/302* (2018.05); *H04N 13/334* (2018.05); *H04N 13/344* (2018.05); *H04N 19/136* (2014.11); *H04N 19/44* (2014.11); *G06T 2200/04* (2013.01); *G06T 2207/20221* (2013.01); *H04N 13/161* (2018.05)

(56) References Cited

U.S. PATENT DOCUMENTS

| | | | |
|---|---|---|---|
| 2010/0045773 A1* | 2/2010 | Ritchey | G02B 13/06 348/36 |
| 2017/0006219 A1 | 1/2017 | Adsumilli et al. | |
| 2017/0046820 A1 | 2/2017 | Steel et al. | |
| 2017/0091970 A1 | 3/2017 | Adsumilli et al. | |
| 2017/0150122 A1* | 5/2017 | Cole | H04N 13/0239 |

OTHER PUBLICATIONS

U.S. Appl. No. 14/872,063, filed with the U.S. Patent and Trademark Office on Sep. 30, 2015.

* cited by examiner

4x3 Render 1310

3x2 Render 1320

MAPPING OF SPHERICAL IMAGE DATA INTO RECTANGULAR FACES FOR TRANSPORT AND DECODING ACROSS NETWORKS

CROSS REFERENCE TO RELATED APPLICATIONS

This application claims the benefit of U.S. Provisional Application No. 62/363,926, filed Jul. 19, 2016 and entitled "Cubic Transport Format for Twin-Lens Spherical Imaging", which is incorporated by reference in its entirety.

BACKGROUND

1. Field of Art

The disclosure generally relates to the field of digital image and video processing, and more particularly to a cubic image transport format that may be used in a mapping of overlapping and non-overlapping sections of two hemispherical images of a spherical image divided along a longitudinal plane.

2. Description of the Related Art

With the use of traditional camera systems, an image is recorded using a camera on a single plane, e.g., as a rectangle. The stored image may have used different aspect ratios (e.g., 16:9), but the image is captured on a flat plane as a rectangular image. Subsequently, the image may be encoded as a rectangular image using various encoding operations (e.g., JPEG, H. 264) without needing to map captured images to the encoded image format. However, with the introduction of 360 degree imaging, a challenge arises in how to capture, map, and encode the captured spherical field of view (FOV) images into an image format that is encoded efficiently and which preserves a large amount of detail. Furthermore, a challenge exists in mapping and encoding process for capturing the 360 degree images in a memory and power efficient manner. In addition, the capture of 360 degree images using multiple cameras can require an efficient and low-artifact method of stitching together the images.

SUMMARY

In one aspect of the present disclosure, a method is disclosed. In one embodiment, the method is for mapping spherical images to a 2D projection of a cubic representation of a spherical field of view (FOV), the method including: capturing a first hemispherical image and a second hemispherical image, each of the first hemispherical image and the second hemispherical image including an overlap portion, the overlap portions capturing a same field of view, the first and second hemispherical images collectively including a spherical FOV and separated along a longitudinal plane; mapping a modified first hemispherical image to a first portion of the 2D projection of a cubic image, the modified first hemispherical image including a non-overlap portion of the first hemispherical image, wherein the mapping of the modified first hemispherical image to the first portion of the 2D projection includes: warping the modified first hemispherical image into a first square image; extracting a first central portion from the first square image, the first central portion being a square image; dividing the remainder of the first square image into four remaining portions of the first square image, the four remaining portions of the first square image having equal size; mapping the first central portion to a first face of the 2D projection of the cubic image; and mapping each of the four remaining portions of the first square image to one half of each of a set of four faces of the 2D projection of the cubic image, the set of four faces of the 2D projection of the cubic image including a second, third, fourth, and fifth face of the 2D projection of the cubic image; mapping a modified second hemispherical image to a second portion of the 2D projection of the cubic image, the modified second hemispherical image including a non-overlap portion of the second hemispherical image; mapping the overlap portions of the first hemispherical image and the second hemispherical image to the 2D projection of the cubic image; and encoding the 2D projection of the cubic image to generate an encoded image representative of the spherical FOV.

In another aspect of the present disclosure, a system is disclosed. In one embodiment, the system is a hardware system for mapping spherical images to a projection of a cubic representation of a spherical field of view (FOV) configured to: capture a first hemispherical image and a second hemispherical image, each of the first hemispherical image and the second hemispherical image including an overlap portion, the overlap portion capturing a same field of view, the first and second hemispherical images collectively including a spherical FOV and separated along a longitudinal plane; map a modified first hemispherical image to a first portion of the 2D projection of a cubic image, the modified first hemispherical image including a non-overlap portion of the first hemispherical image; warp the modified first hemispherical image into a first square image; extract a first central portion from the first square image, the first central portion being a square image; divide the remainder of the first square image into four remaining portions of the first square image, the four remaining portions of the first square image having equal size; map the first central portion to a first face of the 2D projection of the cubic image; and map each of the four remaining portions of the first square image to one half of each of a set of four faces of the 2D projection of the cubic image, the set of four faces of the 2D projection of the cubic image including a second, third, fourth, and fifth face of the 2D projection of the cubic image; map a modified second hemispherical image to a second portion of the 2D projection of the cubic image, the modified second hemispherical image including a non-overlap portion of the second hemispherical image; map the overlap portion of the first hemispherical image and the second hemispherical image to the 2D projection of the cubic image; and encode the 2D projection of the cubic image to generate an encoded image representative of the spherical FOV.

In another aspect of the present disclosure, a non-transitory computer readable apparatus is disclosed. In one embodiment, the non-transitory computer readable apparatus includes a storage medium having computer-readable instructions, the computer-readable instructions which when executed, configured to: receive a first hemispherical image and a second hemispherical image, each of the first hemispherical image and the second hemispherical image including an overlap portion, the overlap portion capturing a same field of view, the first and second hemispherical images collectively including a spherical field of view (FOV) and separated along a longitudinal plane; map a modified first hemispherical image to a first portion of the 2D projection of a cubic image, the modified first hemispherical image including a non-overlap portion of the first hemispherical image; warp the modified first hemispherical image into a first square image; extract a first central portion from the first square image, the first central portion being a square image; divide the remainder of the first square image into four remaining portions of the first square image, the four remaining portions of the first square image having equal size; map the first central portion to a first face of the 2D projection of the cubic image; and map each of the four remaining portions of the first square image to one half of each of a set of four faces of the 2D projection of the cubic image, the set of four faces of the 2D projection of the cubic image including a second, third, fourth, and fifth face of the 2D projection of the cubic image; map a modified second hemispherical image to a second portion of the 2D projection of the cubic image, the modified second hemispherical image including a non-overlap portion of the second hemispherical image; map the overlap portion of the first hemispherical image and the second hemispherical image to the 2D projection of the cubic image; and encode the 2D projection of the cubic image to generate an encoded image representative of the spherical FOV.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Exemplary 360 Degree Camera System

Figure 1:
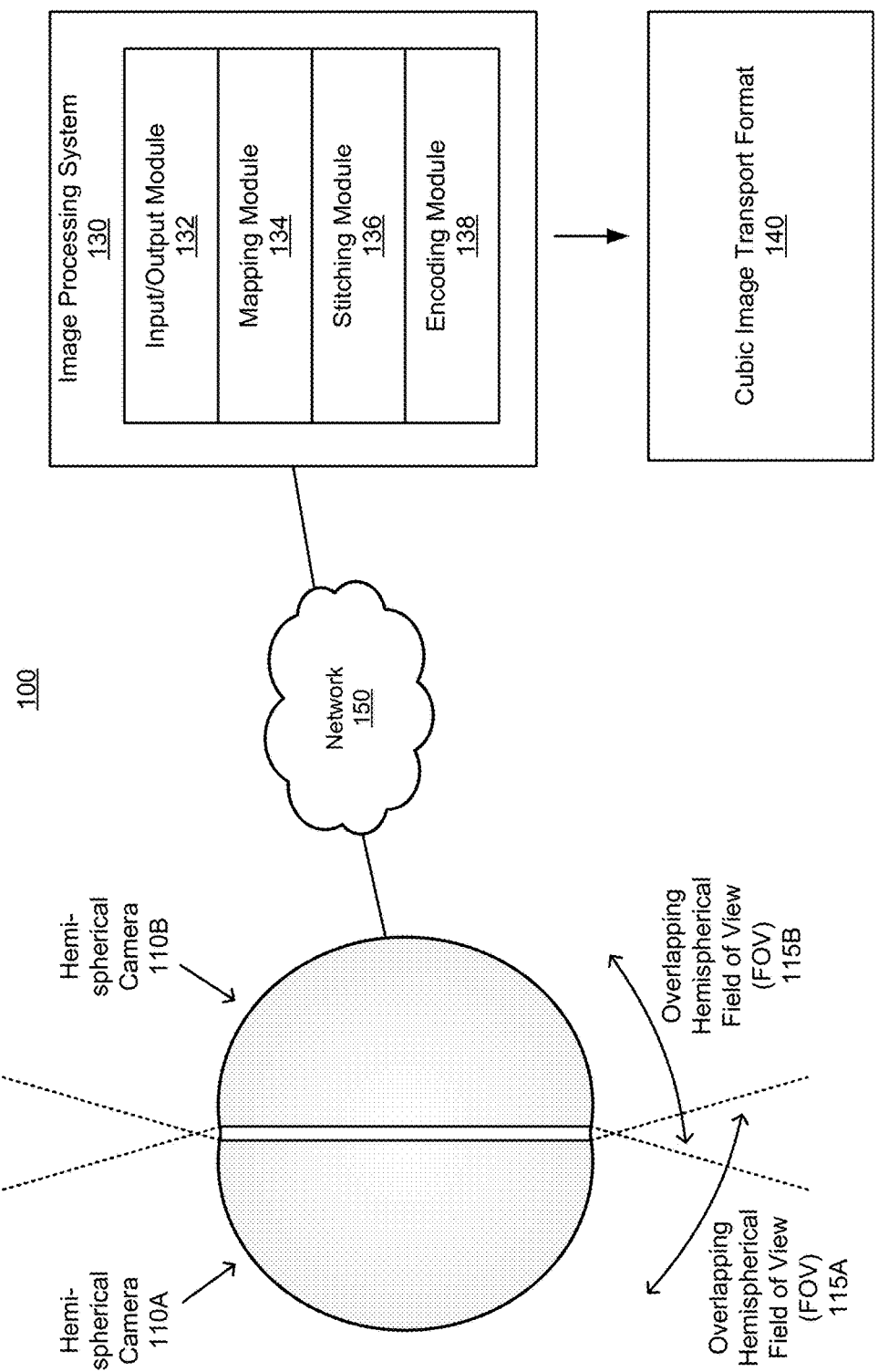
FIG. 1 illustrates a system of hemispherical cameras connectively coupled to an image processing system for capturing 360 degree content and outputting the content in an encoded projection of a cubic image, according to one embodiment.

FIG. 1 illustrates a system 100 of hemispherical cameras connectively coupled to an image processing system for capturing 360 degree content and outputting the content in an encoded projection of a cubic image, according to one embodiment. The system 100 includes, in one embodiment, two hemispherical cameras 110, a network 150, and an image processing system 130.

The network 150 represents the communication pathways between the hemispherical cameras 110 and the image processing system 130. In one embodiment, the network 150 is the Internet, but may also be any network, including but not limited to a LAN, a MAN, a WAN, a mobile, wired or wireless network, a cloud computing network, a private network, or a virtual private network, and any combination thereof. The network 150 may also be an internal network within a device, such as a local message bus or serial communications network. In addition, all or some of links of the network 190 can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The hemispherical cameras 110 are imaging devices with a field of view (FOV) that extend beyond the FOV of a half-sphere, as shown by the overlapping hemispherical FOVs 115 in FIG. 1. In other words, in spherical coordinates, assuming an a zenith perpendicular to and at the mid-point of the line in-between the two hemispherical cameras 110 (shown as a thin white strip in FIG. 1), the FOV of the hemispherical cameras 110 extends 360 degrees along the azimuthal coordinate and in excess of 180 degrees in the polar coordinate. Thus, these hemispherical cameras may capture a "hyper-hemispherical" FOV and may otherwise be known as "hyper-hemispherical cameras," although for ease of discussion they will be referred to as hemispherical cameras 110 in this disclosure.

As shown in FIG. 1, an exemplary FOV of the hemispherical cameras 110 is shown as the overlapping hemispherical FOV 115A and 115B. As shown, the FOVs 115A and 115B overlap with each other, and thus some portions of the images captured by the two hemispherical cameras 110 overlap with each other. This overlap may be used in the subsequent stitching of the images captured by the hemispherical cameras 110. By capturing an overlap, the system may stitch the two images captured from the hemispherical cameras 110 with additional accuracy, allowing for a resulting spherical image with less distortion. The hemispherical cameras 110 may use various types of lens types and shapes, such as a spherical, parabolic, or Fresnel lens, with one or more lens elements, in order to achieve the overlapping hemispherical FOVs 115.

Additionally, the two hemispherical cameras 110 may be separated along a longitudinal plane as shown in FIG. 1. Although in some embodiments the two hemispherical cameras 110 may be separated along a different plane, such as a horizontal or latitudinal plane, by separating the two hemispherical cameras 110 along the longitudinal plane, the detail captured along the horizontal plane of the hemispherical cameras 110 beneficially does not need to be stitched at a later time. Typically, a significant portion of the detail or points of interest in a captured image may lie across a horizontal plane of the image. In such a case, separating the image across a horizontal plane would result in stitching the image across this horizontal plane, which might result in artifacts along this plane having significant detail and thus reduced image quality. Thus, by separating the two hemispherical cameras 110 along a longitudinal plane, additional detail may be preserved in the captured images.

Additional details regarding the hemispherical cameras 110 are described below with reference to FIG. 2.

The image processing system 130 processes the images captured by the hemispherical cameras 110. Although the image processing system 130 is shown in FIG. 1 to be separated from the hemispherical cameras 110, in other embodiments some of the modules (e.g., the input/output module 132 or the mapping module 134) or the entire image processing system 130 is contained within one or both of the hemispherical cameras 110. The image processing system 130 includes an input/output (I/O) module 132, a mapping module 134, a stitching module 136, and an encoding module 138.

The I/O module 132 receives inputs, e.g., captured images and/or videos, from the hemispherical cameras 110 and transmits outputs, e.g., commands, to the hemispherical cameras 110. In one embodiment an I/O module 132 may be included within one of or each of the hemispherical cameras 110, and can receive captured images from the imaging sensors of each hemispherical camera 110. The I/O module 132 may receive the captured image data from the hemispherical cameras 110 as raw data, i.e., raw subpixel values, or may receive the captured image data in a pre-processed format. For example, the received image data may have already been encoded, compressed, mapped, or otherwise modified from the raw values.

The I/O module 132 may simultaneously receive data from both of the hemispherical cameras 110, or may receive data serially from one camera and then from the second. The I/O module 132 may receive the data from the hemispherical cameras 110 in batch, or may receive the data in real-time (or substantially in real-time). For example, the hemispherical cameras 110 may capture images at a high rate (e.g., 30-240 frames per second) to allow for the later generation of a video based on the captured images. The I/O module 132 may in this case receive these captured images at this rate in real-time, or may subsequently receive the captured images in one or more batches.

The mapping module 134 maps the captured images from the hemispherical cameras 110 into an alternate representation for the purposes of storing the captured images. The mapping module 134, may for example, map the captured images from the hemispherical cameras 110 to a cubic image representing the spherical FOV captured by the images. This cubic image may also be stored as a two-dimensional representation, e.g., by "flattening" out each face onto a single plane. In order to map the captured images to the alternate representation, the mapping module 134 may perform various warping and image manipulation on the captured images to generate the alternate representation. By mapping the spherical images of the hemispherical cameras 110 to an alternate representation, additional efficiencies may be achieved in the encoding of the images. For example, an encoded cubic image may be more efficiently encoded compared to a spherical image.

In addition, the captured images from the hemispherical cameras 110 may include overlap portions that capture the same FOV, as shown by the overlapping hemispherical FOVs 115 in FIG. 1. The mapping module 134 may additionally and separately map these overlap portions to portions of the alternate representation. The mapping module 134 may map these overlap portions based on, for instance, encoding efficiency requirements, storage requirements, minimum artifact or distortion levels, or other requirements or considerations.

Additional details regarding mapping operations and the mapping module 134 will be described below with regards to FIGS. 3-10.

The stitching module 136 stitches or combines the two hemispherical images captured by the hemispherical cameras 110 into a complete stitched image by performing one or more stitching operations on the hemispherical images and/or combining the overlapping portions of each hemispherical image to reduce visual artifacts. As the hemispherical images are captured using separate cameras, the two images, if joined together, may not be completely visually continuous, i.e., the elements in one hemispherical image may not visually align perfectly or to within a degree of tolerance with the elements in the other hemispherical image. The stitching operations are performed on the two hemispherical images such that the resulting stitched image has a reduced number of discontinuities or other visual imperfections or errors that would indicate that the stitched image was formed from two separate images.

In one embodiment, the stitching module 136 performs one or more stitching operations on the overlapping portions of the two hemispherical images which have been mapped to the alternative representation by the mapping module 134. The stitching module 136 combines the stitched overlapping portions with the non-overlapping portions of the alternative representation to create the complete stitched image. The stitching of the overlap sections may be performed using various stitching operations, such as using a depth-based stitching operation. Additional details regarding stitching images are described in U.S. patent application Ser. No. 15/234,869, filed on Aug. 11, 2016 and entitled "Equatorial Stitching of Hemispherical Images in a Spherical Image Capture System" and issued as U.S. Pat. No. 10,043,237, U.S. patent application Ser. No. 14/872,063, filed on Sep. 30, 2015 and entitled "UNIFIED IMAGE PROCESSING FOR COMBINED IMAGES BASED ON SPATIALLY CO-LOCATED ZONES" and issued as U.S. Pat. No. 9,786,077, U.S. patent application Ser. No. 14/872,017, filed on Sep. 30, 2015 and entitled "SEPARATE RANGE TONE MAPPING FOR COMPONENT IMAGES IN A COMBINED IMAGE" and issued as U.S. Pat. No. 9,571,759, U.S. patent application Ser. No. 14/754,694, filed on Jun. 30, 2015 and entitled "IMAGE STITCHING IN A MULTI-CAMERA ARRAY", and U.S. patent application Ser. No. 14/308,495, filed on Jun. 18, 2014 and entitled "Mult-Camera Array with Adjacent Fields of View" and issued as U.S. Pat. No. 9,330,436, all of which are incorporated by reference in their entirety.

Additional details regarding the stitching module 136 are described below with regards to FIGS. 2-13.

The encoding module 138 encodes the captured images from the hemispherical cameras 110 in a particular format for transport. In one embodiment, the encoding module 138 encodes the alternative representation of the captured image from the hemispherical cameras 110 before stitching has occurred. In one embodiment, the encoding module 138 encodes the complete stitched image of the alternative representation. In particular, the encoding module 138 may encode a projection of the alternative representation. For example, if the alternative representation is a cubic image, a projection of the cubic image may convert the cubic image to a 2-dimensional ("2D") plane, with each face of the cube arranged in a particular location and/or orientation on the 2D plane. The encoding module 138 may encode this 2D projection of the cubic image. Various encoding operations, when applied to the 2D projection, may result in different encoding artifacts and/or efficiencies. The encoding module 138 may encode the images using a particular encoding operation (e.g., H. 264), encoding settings (e.g., average bit rate settings), and/or arrangement of the projection of the alternative representation (or the original images) in order to achieve a certain level of efficiency (e.g., storage size) and/or a certain quality level (e.g., SNR level or artifact level). Additional details regarding the encoding module 138 are described below with regards to FIGS. 3-13.

Example Camera Configuration

Figure 2:
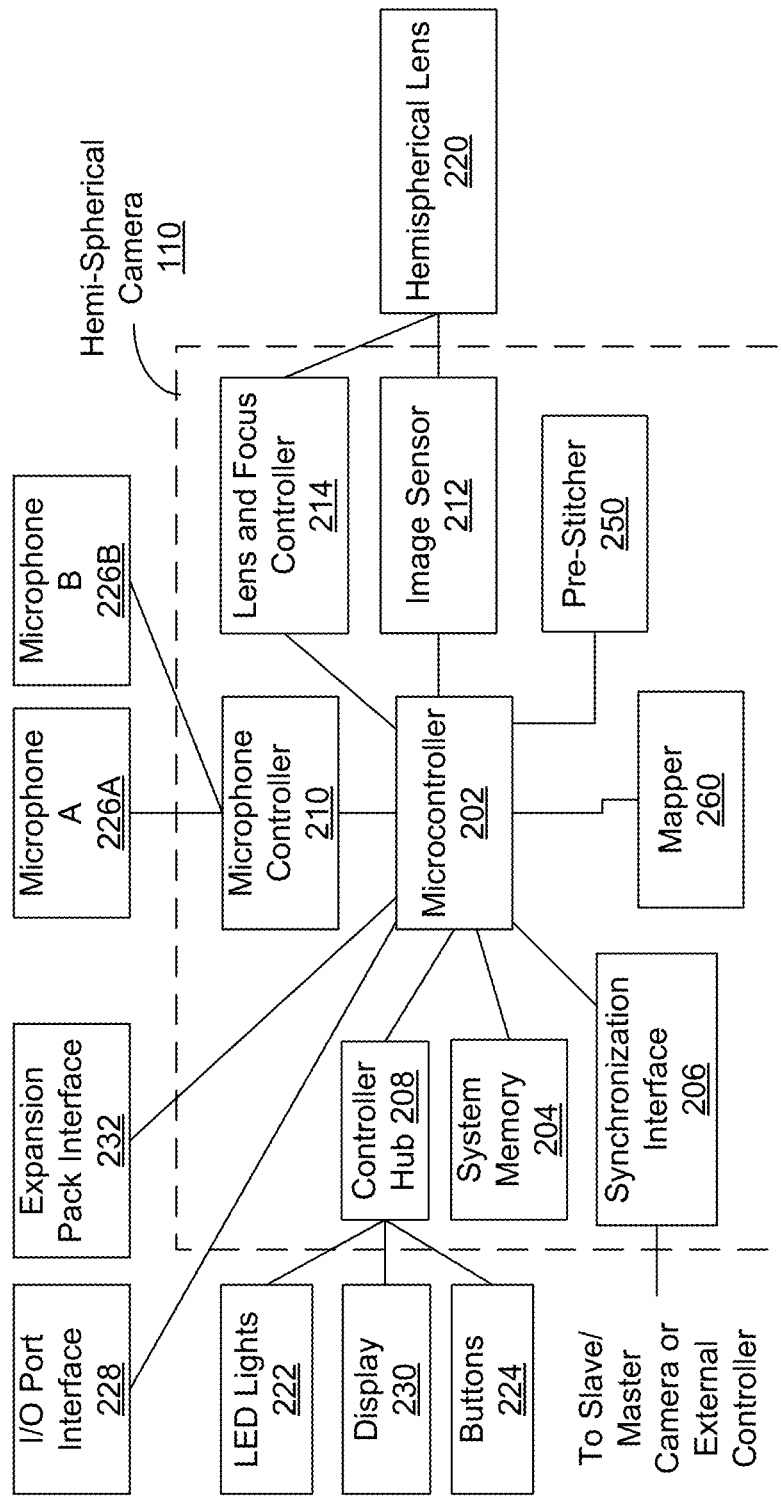
FIG. 2 is a block diagram illustrating electronic components of a camera 200, according to one embodiment.

FIG. 2 is a block diagram illustrating electronic components of a camera 200, according to one embodiment. The camera 200 of the embodiment of FIG. 2 includes one or more microcontrollers 202, a system memory 204, a synchronization interface 206, a controller hub 208, one or more microphone controllers 210, an image sensor 212, a hemispherical lens 220, a lens and focus controller 214, one or more lenses 220, one or more LED lights 222, one or more buttons 224, one or more microphones 226, an I/O port interface 228, a display 230, an expansion pack interface 232, a pre-stitcher 250, and a mapper 260. In one embodiment, the camera 200 may be a component of one of the hemispherical cameras 110 or may comprise one of the hemispherical cameras 110.

The camera 200 includes one or more microcontrollers 202 (such as a processor) that control the operation and functionality of the camera 200. For instance, the microcontrollers 202 can execute computer instructions stored on the memory 204 to perform the functionality described herein.

It should be noted that although lookup table (LUT) generation and color model conversion are described herein as performed by the camera 200, in practice, the camera 200 can capture image data, can provide the image data to an external system (such as a computer, a mobile phone, or another camera), and the external system can generate a LUT based on the captured image data.

A lens and focus controller 214 is configured to control the operation, configuration, and focus of the camera lens 220, for instance based on user input or based on analysis of captured image data. The image sensor 212 is a device capable of electronically capturing light incident on the image sensor 212 and converting the captured light to image data. The image sensor 212 can be a complementary metal oxide semiconductor (CMOS) sensor, a charged coupled device (CCD) sensor, or any other suitable type of image sensor, and can include corresponding transistors, photodiodes, amplifiers, analog-to-digital converters, and power supplies. In one embodiment, the image sensor 212 includes a Bayer color filter array.

The hemispherical lens 220 is a lens that may receive photons from a "hyper hemispherical" FOV as described above (i.e., the FOV exceeds 180 degrees in the polar coordinate). The hemispherical lens 220 may include a spherical, parabolic, Fresnel, or other type of curved lens(es) composed of optically transparent material such as glass, transparent plastic polymers, which are capable of changing the path of light arriving from a hyper-hemispherical FOV and align this light to be collected by the image sensor 212.

A system memory 204 is configured to store executable computer instructions that, when executed by the microcontroller 202, perform the camera functionalities described herein. The system memory 204 also stores images captured using the lens 220 and image sensor 212. The memory 204 can include volatile memory (e.g., random access memory (RAM)), non-volatile memory (e.g., a flash memory), or a combination thereof. In one embodiment, the system memory 204 includes executable code that when executed by the microcontroller 202 perform the operations of one or more of the modules of the image processing system 130.

A synchronization interface 206 is configured to communicatively couple the camera 200 with external devices, such as a remote control, another camera (such as a slave camera or master camera, e.g., a hemispherical camera 110), a computer, or a smartphone. The synchronization interface 206 may transfer information through a network, which allows coupled devices, including the camera 200, to exchange data other over local-area or wide-area networks. The network may contain a combination of wired or wireless technology and make use of various connection standards and protocols, such as Wi-Fi, IEEE 2394, Ethernet, 802.11, 4G, or Bluetooth.

A controller hub 208 transmits and receives information from user I/O components. In one embodiment, the controller hub 208 interfaces with the LED lights 222, the display 230, and the buttons 224. However, the controller hub 208 can interface with any conventional user I/O component or components. For example, the controller hub 208 may send information to other user I/O components, such as a speaker.

A microphone controller 210 receives and captures audio signals from one or more microphones, such as microphone 226A and microphone 226B. Although the embodiment of FIG. 1 illustrates two microphones, in practice, the camera can include any number of microphones. The microphone controller 210 is configured to control the operation of the microphones 226. In some embodiments, the microphone controller 210 selects which microphones from which audio data is captured. For instance, for a camera 200 with multiple microphone pairs, the microphone controller 210 selects one microphone of the pair to capture audio data. Multiple microphones may also be configured together for a separate function, e.g., in order to capture audio signals while cancelling out background noise.

In one embodiment, the camera 200 includes a pre-stitcher 250 to perform preliminary stitching operations between two captured images which may have overlap regions, e.g., the captured hemispherical images of the hemispherical cameras 110. As the camera 200 may be optimized for lower power consumption, its performance may be more limited compared to an external stitching/processing system. Thus, the pre-stitcher 250 may only perform a preliminary stitching of the captured images using more efficient set of operations rather than using the full set of operations that may be used by the external system to stitch the captured images together. The efficient set of operations may fit within certain power and memory requirements, and may be, for example, an average of the overlap regions of the captured images. Additional details regarding the pre-stitcher 250 will be described below with reference to FIG. 12.

In one embodiment, the camera 200 includes a mapper 260 to perform a mapping of the captured images from the hemispherical lens 220. For example, if the captured images are spherical, the mapper 260 may convert these images to a cubic representation of the spherical images using various warping, mapping, and other image manipulation operations. In one embodiment, the functionality of the mapper 260 may be the same as the functionality of the mapping module 134 as described in FIG. 1. Additional details regarding the mapper 260 are described below with reference to FIGS. 3-10.

Although the pre-stitcher 250 and mapper 260 are described here as separate components of the camera 200, in other embodiments the functionality of the pre-stitcher 250 and the mapper 260 may be executed by the microcontroller 202 or other component of the camera 200, or may be executed by an external device.

Additional components connected to the microcontroller 202 include an I/O port interface 228 and an expansion pack interface 232. The I/O port interface 228 may facilitate the camera 200 in receiving or transmitting video or audio information through an I/O port. Examples of I/O ports or interfaces include USB ports, HDMI ports, Ethernet ports, audio ports, and the like. Furthermore, embodiments of the I/O port interface 228 may include wireless ports that can accommodate wireless connections. Examples of wireless ports include Bluetooth, Wireless USB, Near Field Communication (NFC), and the like. The expansion pack interface 232 is configured to interface with camera add-ons and removable expansion packs, such as an extra battery module, a wireless module, and the like.

Spherical to Cubic Mapping Conversion Example

Figure 3:
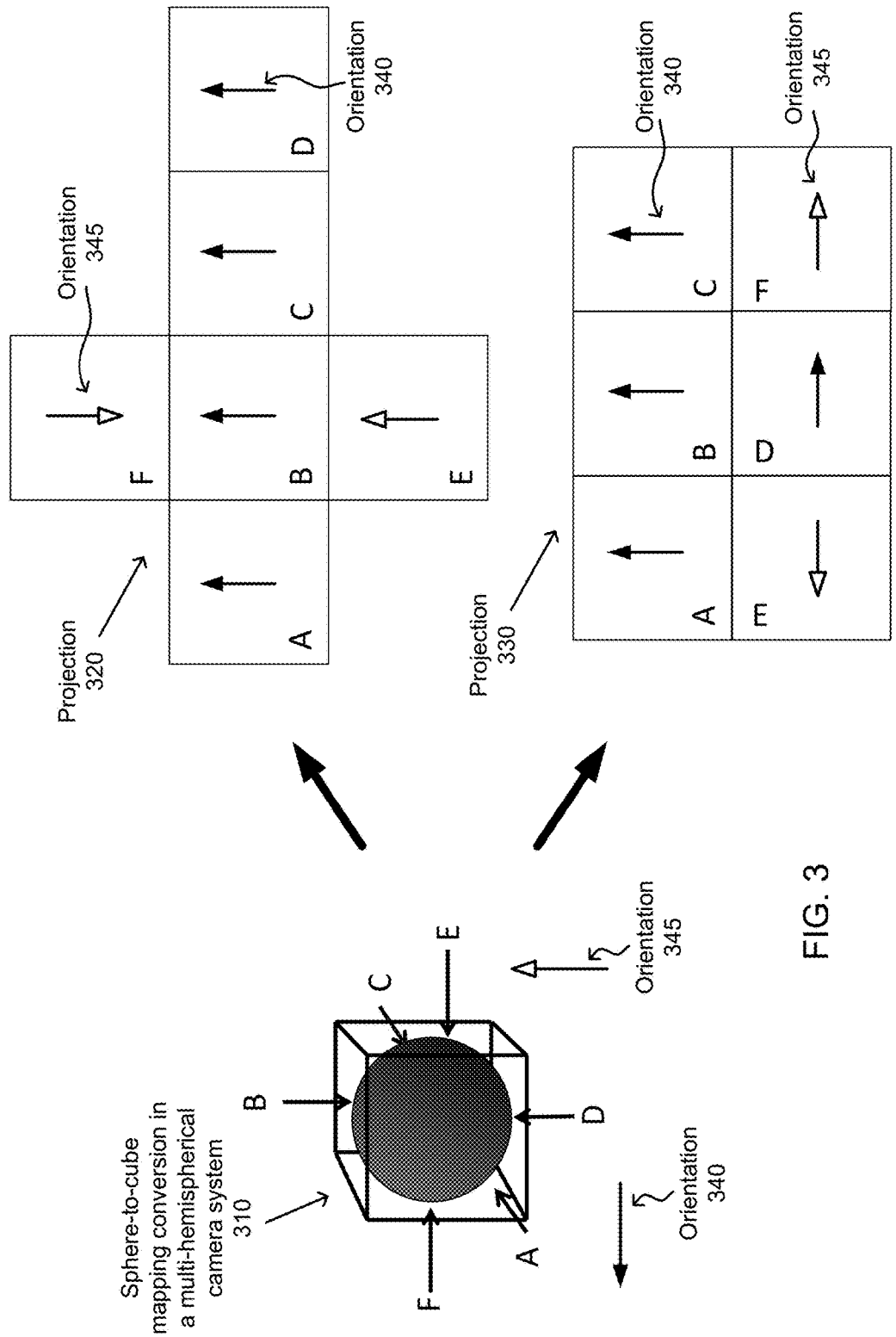
FIG. 3 illustrates an exemplary conversion of a spherical image to a cubic image representation of the spherical image in a multi-hemispherical camera system, such as the system of hemispherical cameras described in FIG. 1, according to one embodiment.

FIG. 3 illustrates an exemplary conversion of a spherical image to a cubic image representation of the spherical image in a multi-hemispherical camera system, such as the system of hemispherical cameras 110 described in FIG. 1, according to one embodiment.

As noted above, the hemispherical cameras 110 capture a spherical image. The conversion process begins with a sphere-to-cube mapping conversion in a multi-hemispherical camera system as shown at 310 (hereinafter referred to as "conversion 310"). The sphere in the conversion 310 represents the images captured by the hemispherical cameras 110 (the overlapping regions are not shown). The images captured by the hemispherical cameras 110 collectively form a spherical image, with a spherical FOV. This spherical FOV of the hemispherical cameras 110 is a FOV that captures light from all angles which converge at the hemispherical cameras 110. In one embodiment, the mapping conversion is performed by the mapping module 134, which may be on the hemispherical cameras 110.

Converting the spherical image to the cubic representation may in one embodiment comprise mapping the spherical image to the six faces of a cube that forms the cubic image that represents the spherical FOV. As shown in FIG. 3, each face is indicated with a letter from A to F, with A indicating the front face, E and F indicating side faces, B and D indicating the bottom and top faces, respectively, and C indicating the back face. As described above and in further detail below, the mapping may involve various image manipulation operations to convert the spherical image to the cubic representation.

Two exemplary projections 320 and 330 of the cubic representation of the spherical FOV are also shown in FIG. 3. The projection 320 arranges the faces of the cubic representation with the faces A through D placed horizontally and consecutively in a series, and with the F face and the E face aligned vertically above and below the face B. As shown, the projection 330 instead arranges the faces in a 3×2 grid, with the faces A, B, and C arranged horizontally in a series, and the faces E, D, and F arranged horizontally in a series below the first three faces A, B, and C.

In addition, the faces may be oriented such that the images on each face are visually continuous with at least some of the images of the adjacent faces. The continuity of the images in the faces may improve the encoding efficiency of the projection. For example, the images of the projection 320 are arranged according to the orientations 340 and 345. The orientation 340 points left, and is shown as a solid arrow with respect to the cube in the conversion 310. This orientation applies to the faces A, B, C, and D. In the projection 320, the faces A, B, C, and D of the cubic image shown in the conversion 310 are rotated so that the orientation 340 points up. For example, face C may have been rotated 90 degrees in a clockwise rotation so that the orientation 340 for face C, which originally pointed left, now points up. The orientation 345, as shown as a hollow arrow and with respect to the cube in the conversion 310, applies to the faces F and E. The orientation 340 points up in the cubic image of conversion 310. In the projection 320, the faces F and E are rotated and orientated according to the direction of the arrow indicated by the orientation 340. For example, face F may be rotated or flipped upside-down such that now the orientation 345 of face F points downwards as shown in the projection 320. A similar process is performed for the projection 330, where the faces are rotated or oriented according to the orientations 340 and 345 as shown in FIG. 3. For example, face E, when arranged in projection 330, is rotated anti-clockwise by 90 degrees (or clockwise by 270 degrees) so that the orientation 345 of face E, while originally pointing up, now points to the left. Note that the images on each face may not be completely visually continuous due to errors in capturing the image from two separate hemispherical cameras.

Exemplary Mapping of Hemispherical Images with Spherical FOV to 2D Image

Figure 4:
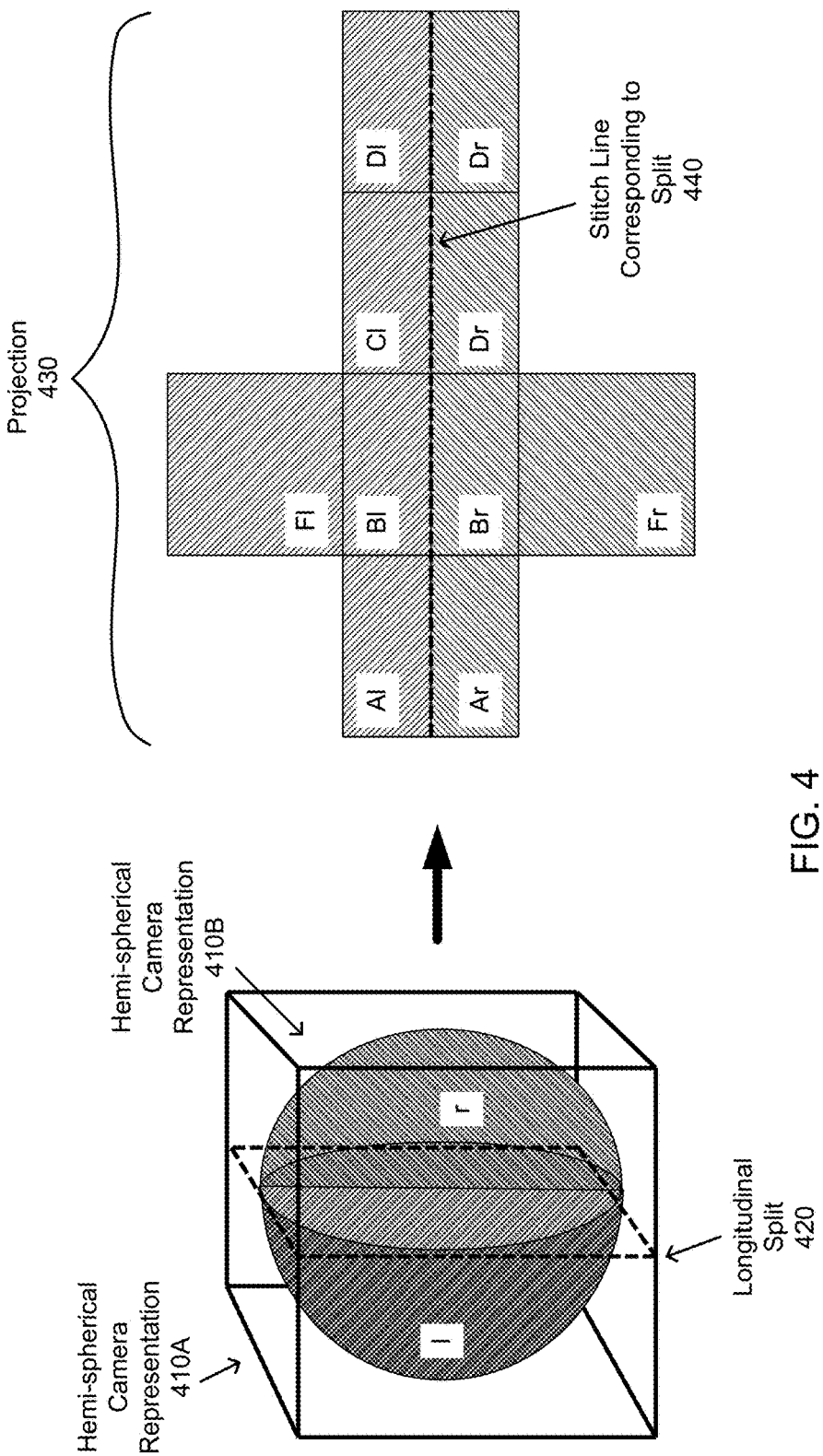
FIG. 4 illustrates an exemplary projection of a cubic representation of two captured hemispherical images representing a spherical FOV, according to one embodiment.

FIG. 4 Illustrates an Exemplary Projection of a Cubic Representation of Two Captured hemispherical images representing a spherical FOV, according to one embodiment. FIG. 3 illustrates a conversion 310 from a spherical image to a cubic image representing the spherical image. However, as shown in FIG. 4, the spherical image may be captured via two hemispherical cameras, such as the hemispherical cameras 110 shown in FIG. 1, creating two hemispherical images split along a longitudinal plane. As the spherical image comprises two separate hemispherical images, these images may need to be subsequently stitched together. However, as shown, they may initially be mapped to the cubic representation by one or both of the hemispherical cameras 110 (or by the image processing system 130) and stored as a projection, such as projection 430, of the cubic image representing the spherical FOV of the spherical image.

As shown in FIG. 4, the split of the two hemispherical camera representations 410A and 410B is along a longitudinal plane, and thus the spherical image shown in FIG. 4 has a longitudinal split 420. The spherical image is thus separated into "left" or "right" hemispherical images, and this is indicated by a lowercase "l" and a lowercase "r" in FIG. 4 for each hemispherical camera representation 410A and 410B, respectively. Although the two hemispherical images of the two hemispherical cameras are indicated as "l" and "r," the two hemispherical cameras do not actually need to be oriented on a left or right side.

The longitudinal split 420, when mapped to the projection 430 of the cubic mapping of the spherical image, may correspond to a stitch line 440 as shown in FIG. 4. The projection 430 is arranged in a similar fashion to the projection 320 of FIG. 3. As shown in FIG. 4, the origination of each portion of each face in the projection 430 is indicated by the lowercase "l" or the lowercase "r," indicating that the portion originates from the "l" hemispherical image or the "r" hemispherical image, respectively. In particular, the F face is from the "l" side, the E face is from the "r" side. The remaining faces A, B, C, and D are split along the stitch line 440 which corresponds to the longitudinal split 420. In particular, face A is split with a portion "Al" representing the portion of A captured by the "l" hemispherical image and a portion "Ar" representing the portion of A captured by the "r" hemispherical image. The remaining faces B, C, and D are split similarly into portions Bl, Br, Cl, Cr, Dl, and Dr.

Figure 5:
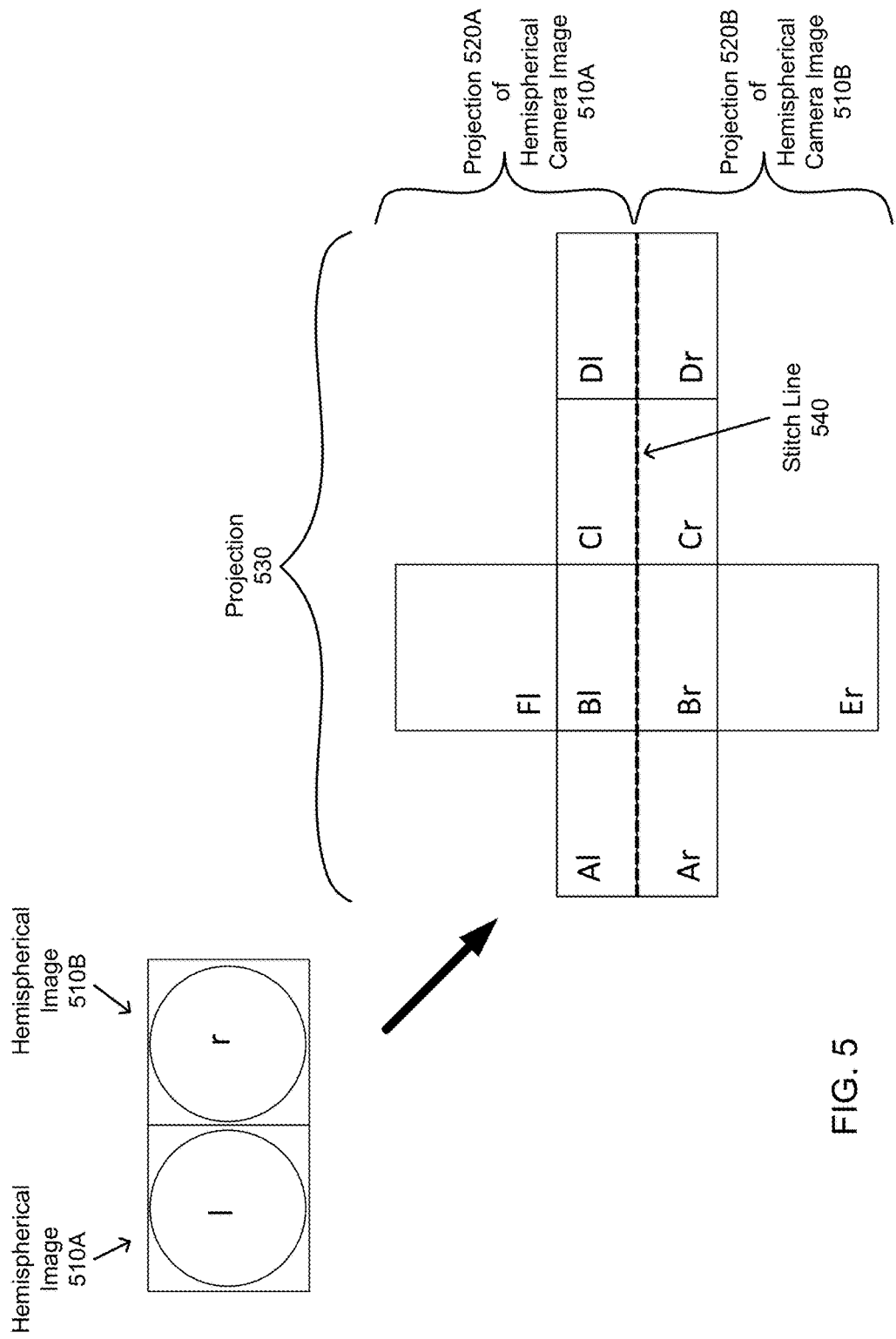
FIG. 5 illustrates an example of a mapping from two hemispherical camera images to the projection of a cubic representation of the spherical FOV, according to one embodiment.

FIG. 5 illustrates an example of a mapping from two hemispherical images to the projection of a cubic representation of the spherical FOV captured by the hemispherical images, according to one embodiment. As shown in FIG. 5, the two hemispherical images 510 have been captured, and are labeled "l" and "r". As noted above, the labels do not necessarily indicate that one camera was oriented on a left side and one camera on a right side. The hemispherical camera images 510 are separated on a longitudinal plane.

The hemispherical images 510 are circular as they were captured from the hemispherical cameras 110, and thus, as described above, the cameras 110 and/or the image processing system 130 may perform a mapping operation to map the hemispherical images to the projection 530 of a cubic image representing the spherical FOV captured by the hemispherical cameras 110.

In one embodiment, the mapping of the two hemispherical camera images 510 into the projection 530 is performed by the mapping module 134. For each hemispherical image 510, the mapping module 134 may warp the hemispherical image 510 by extending or stretching a first set of four regions or portions of the hemispherical image 510. These four regions of the hemispherical image 510 are four corners of the hemispherical image corresponding to four corners of an imaginary box enclosing the hemispherical image 510 (with at least one side of the imaginary box parallel to the longitudinal plane separating the hemispherical images 510). In other words, a line drawn from the center of the hemispherical image to a corner would be orthogonal to adjacent lines drawn from the center of the hemispherical image to adjacent corners.

After warping the four regions by a certain threshold, the mapping module 134 may further warp the hemispherical image 510 a second time by compressing a second set of four regions of the hemispherical image 510 that may correspond to the flat edges of the imaginary box. In other words, each region would be at the midpoint between two corners as described above. The mapping module 134 may perform additional image manipulations on the hemispherical image 510, such that the resulting image has a square shape or a near square shape (or rectangular shape). The mapping module may extract from the warped hemispherical image 510 a central portion of a defined size. The central portion of the "l" hemispherical image and the "r" hemispherical image may correspond to the faces Fl and Er in the resulting projection, respectively. The additional faces of the projection are generated by the mapping module 134 by dividing the remainder of the warped hemispherical image into four remaining portions. Each of the four remaining portions includes an equal area to the other sections, and corresponds to a portion of the warped hemispherical image 510 between the edge of the warped hemispherical image 510 and a corresponding edge of the extracted central portion. Note that each of the remaining portions approximately forms a trapezoidal shape, with the shorter edge being the edge of the central portion, and the longer edge being the edge of the warped hemispherical image 510.

Each of these four remaining portions forms one portion (or half) of each of the remaining faces of the projection, which are arranged to be laterally (horizontally) adjacent to each other as shown in FIG. 5. For example, for face A, the portion "Al" is one of the remaining four portions of the warped hemispherical image corresponding to the "l" hemispherical image 510. The portion "Ar" is one of the four remaining portions of the warped hemispherical image corresponding to the "r" hemispherical image 510. Note that the "Ar" and "Al" portions represent a continuous FOV, with the FOV represented in each portion being adjacent to each other. Thus, the "Ar" portion is substantially visually continuous with the "Al" portion, although the visual continuity may not be complete or perfect due to alignment errors, mapping errors, or other visual artifacts due to the capturing of these two portions from two different hemispherical cameras and the warping and mapping of these portions to the cubic image. Furthermore, the combination of the Ar and Al portions is of the same size as each of the central faces Fl or Er. The other portions Bl, Br, Cl, Cr, Dl, and Dr are similarly formed and have similar properties.

By having the central portion of each hemispherical image 510 mapped to a portion of the projection with no stitch line dividing the portion, the detail of the image in the central portion is better preserved, and may also be used directly for presentation and not require additional re-encoding or other processing, as would be the case with the faces having the stitch line (e.g., the face A).

Referring back to FIG. 5, the stitch line 540 in the projection 530 corresponds to the separation between the projection 520A of the hemispherical camera image 510A and the projection 520B of the hemispherical image 520B. As shown in FIG. 5, the "l" hemispherical image 510A is mapped to Fl, Al, Bl, Cl, and Dl in the projection 530. The "r" hemispherical image 510B is mapped to Er, Ar, Br, Cr, and Dr in the projection 530. This may be done in accordance with the method described above.

Figure 6:
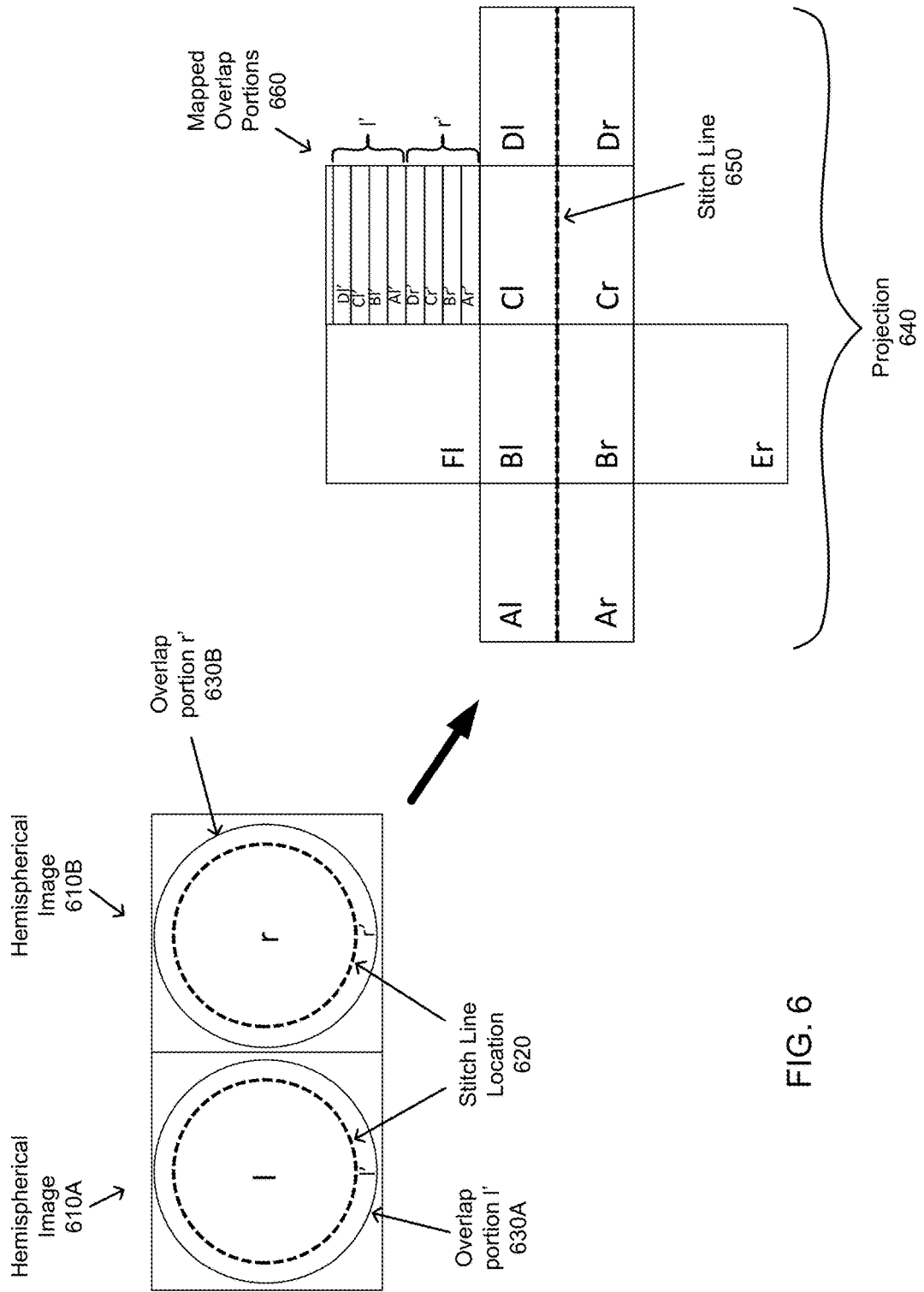
FIG. 6 illustrates an example of a mapping from two hemispherical camera images to the projection of a cubic representation of the spherical FOV including the overlap portions captured by the hemispherical cameras, according to one embodiment.

FIG. 6 illustrates an example of a mapping from two hemispherical camera images to the projection of a cubic representation of the spherical FOV including the overlap portions captured by the hemispherical cameras 110, according to one embodiment. While FIG. 5 illustrated two hemispherical images 510 with no overlap, FIG. 6 illustrates the hemispherical images 610 captured with corresponding overlaps 630 from each hemispherical camera.

Similar to the process shown in FIG. 5, the hemispherical camera images 610 are mapped to the projection 640 in to the portions Al, Ar, Bl, Br, Cl, Cr, Dl, Dr, Fl, and Er. Furthermore, the hemispherical images 610 in FIG. 6 also include an overlap portion l' 630A and an overlap portion r' 630B. These are the portions of the image captured by the hemispherical cameras 110 that overlap in FOVs, i.e., the overlapping hemispherical FOVs 115. These overlap portions are mapped, e.g., by the mapping module 134, to the projection 640. In one embodiment, the mapping module 134 maps the overlap portion 630 by dividing each overlap portion 630 into four sub-portions, each sub-portion visually continuous to one of the split faces of the projection 640, i.e., the faces A, B, C, D. For example, sub-portion "Al'" is visually continuous with portion "Ar." These overlap portions are stacked together as the mapped overlap portions 660 and placed to the right of Fl in the projection 640 as shown in FIG. 6.

In one embodiment, to perform the mapping of the overlap portions 630, the mapping module 134 warps the overlap portion 630 along with the hemispherical image 610. This warping may be performed in the same fashion as described above with reference to FIG. 5, but for a circular image that includes the hemispherical image 610 along with the overlap portion 630 surrounding the hemispherical image 610. As described above, the warped hemispherical image includes a central portion that comprises one face and four adjacent portions, each roughly shaped as a trapezoid and comprising one half of one of the four faces A, B, C, and D that have a stitch line running through them. The portion of the warped hemispherical image originally belonging to the overlap portion 630 is divided such that the portions of the overlap portion 630 adjacent to one of the four trapezoid portions corresponds to the overlap portion for that corresponding half face.

For example, the Dl' portion of the projection 640 corresponds to the sub-portion of the overlap portion l' in the "l" side warped hemispherical image that is adjacent to the trapezoidal portion that is to form the Dl portion in the projection 640. The Dl' portion and the other mapped overlap portions 660 are the same width as the other faces in the projection 640. However, the height of all eight mapped overlap portions 660 may not be the same height as each face in the projection 640. If this is the case, the remaining space may be filled with a uniform pixel value, such as zero. This filling of uniform pixel values may also apply to those sections of the projection 640 where no faces exist but which are within a boundary of a imaginary bounding box that is a minimum dimension to encapsulate the projection 640, such that after filling with the uniform pixel values, the resulting image is rectangular.

Note that the particular order of the mapped overlap portions may differ from the depiction in FIG. 6. In one embodiment, the mapped overlap portions 660 are arranged (by the mapping module 134) such that the portions corresponding to each face, e.g., A, B, C, and D, are adjacent to each other and oriented to achieve visual continuity between the pairs of overlap portions. Thus, Ar' and Al' may be oriented adjacent to each other, Br' and Bl' are adjacent to each other, and so on.

By mapping the mapped overlap portions 660 to a portion of the projection 640 separate from the faces A, B, C, D, E, and F, the image processing system 130, when processing the projection 640, may ignore the mapped overlap portions 660 if the image processing system 130 does not support processing (e.g., stitching) of the mapped overlap portions 660, as the structure of the other faces in the projection 640 are not changed from, e.g., the projection 530 which does not include the mapped overlap sections 660.

Figure 7:
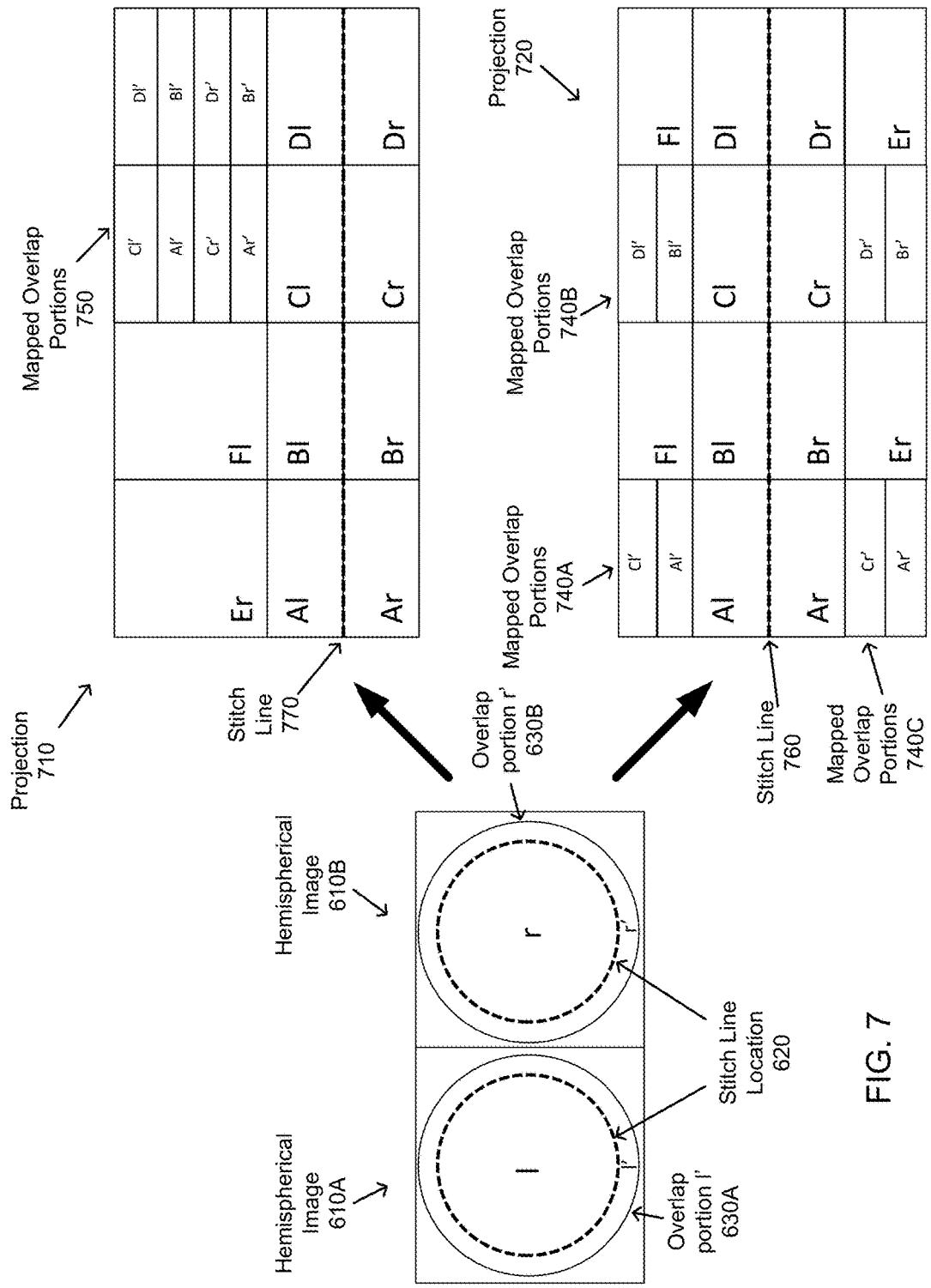
FIG. 7 illustrates additional exemplary mappings from two hemispherical camera images to different projections, according to one embodiment.

FIG. 7 illustrates additional exemplary mappings from two hemispherical camera images to different projections, according to one embodiment. FIG. 7 illustrates additional methods in addition to those shown in FIG. 6 for mapping hemispherical images 610 to various projection arrangements.

Two projections are presented in FIG. 7, a projection 710 and a projection 720. The faces and mapped overlap sections in these two projections are arranged such that they completely fill an imaginary rectangular bounding box, unlike the projection of FIG. 6, which includes "empty" space. The projection 710 includes the mapped overlap portions 750 arranged in a "2×4" pattern as shown in the top right section of the projection 710, and also has the two central portion faces Er and Fl arranged next to each other on the top left. In one embodiment, the faces and mapped overlap sections 750 of the projection 710 are generated in the same fashion as described above. Furthermore, in one embodiment, the mapped overlap sections 750 are arranged such that one mapped overlap section 750 is adjacent to another mapped overlap section 750 that is visually continuous with that one mapped overlap section 750 on a short edge. For example, the mapped overlap portion 750 Cl' is adjacent to the portion Dl'. Note that the faces C and D are also adjacent to each other along the same corresponding edge.

The projection 720 arranges the mapped overlap portions 740 in a different fashion from the projection 710 such that different portions of the projection 720 are visually continuous with each other. For example, the face Fl is split into two equal portions, each portion continuous with Bl and Dl. The face Er is also split to be continuous with Br and Dr. These portions may be inverted or oriented differently in order to achieve this visual continuity. For example, Fl may be flipped vertically (according to the orientation of the figure) to be visually continuous with Dl, or vice versa.

Not that the mapped overlap portions 750 and 740 in projections 710 and 720 may be larger than the respective mapped overlap portions 660 in FIG. 6. This may allow the projections 710 and 720 to store more information (i.e., detail) for the overlap portions of the hemispherical images 610.

As noted above, by having certain portions in the projections 710 and 720 be visually continuous with each other, during encoding of the projections, e.g., by the camera 110 or the image processing system 130, additional encoding optimizations are achieve, e.g., in storage space, memory requirements, encoding speed, and so on, when more regions of the images are visually continuous.

In contrast to the projection 640 in FIG. 6, the projections 710 and 720 in FIG. 7 are rectangular in overall shape. This may also improve encoding efficiencies, e.g., in storage space, encoding speed, memory requirements, and so on, as some encoding processes may have improved efficiency with a rectangular image rather than a non-rectangular image. Furthermore, in projection 640, various portions of the projection 640 where no data exists may be filled with pixels of a uniform pixel value (e.g., black). The encoding of these filler areas may also decrease encoding efficiency. Such an issue does not exist for the projections 710 and 720.

Figure 8:
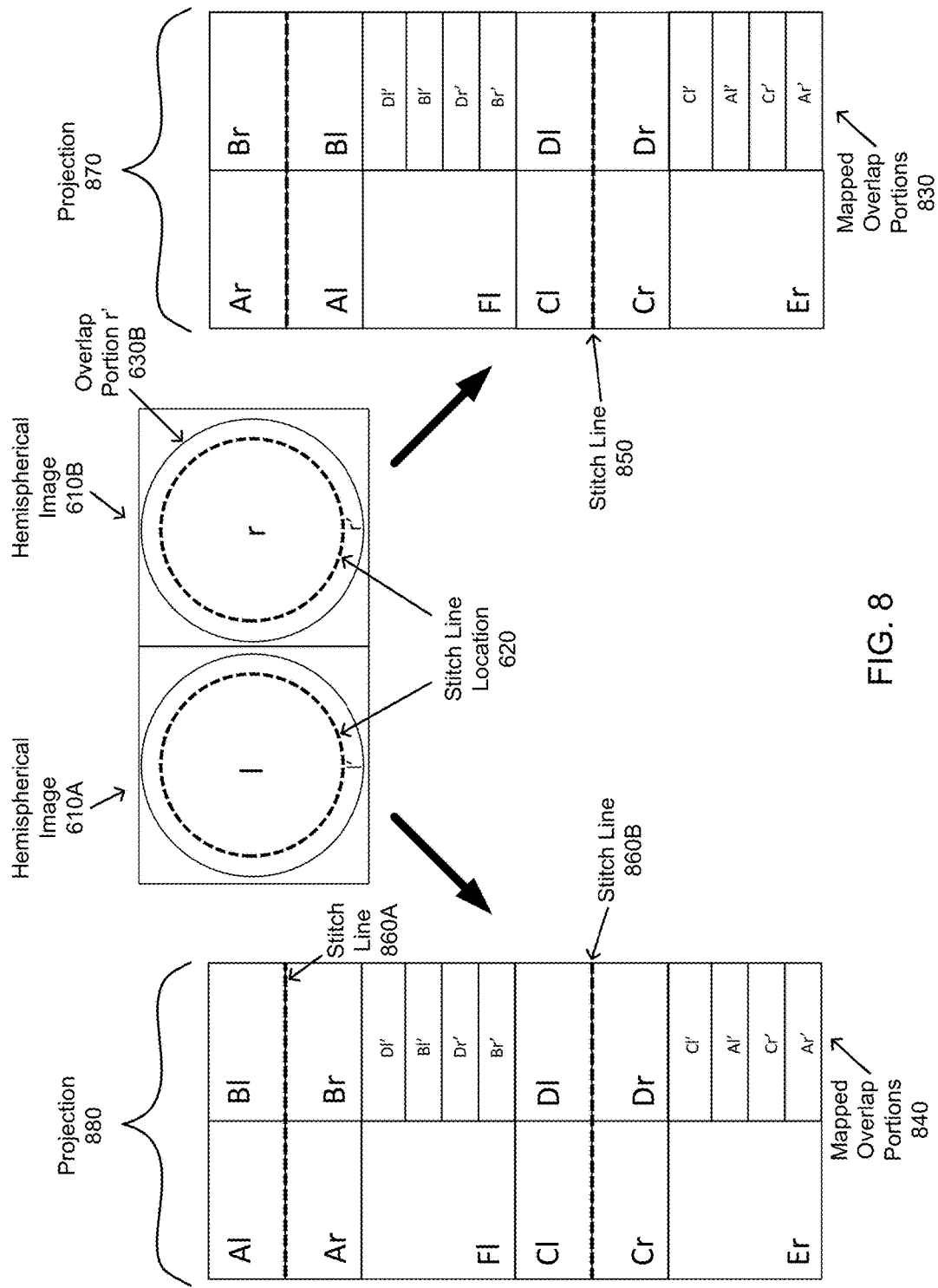
FIG. 8 illustrates additional exemplary mappings from two hemispherical camera images to different projections, according to one embodiment.

FIG. 8 illustrates additional exemplary mappings from two hemispherical camera images to different projections, according to one embodiment. FIG. 8 illustrates additional methods in addition to those shown in FIG. 6 and FIG. 7 for mapping the hemispherical images 610 to various projection arrangements.

As shown in FIG. 8, the hemispherical images 610 are mapped, e.g., by the mapping module 134, to projections 880 and projection 870. These projections are arranged vertically compared to the horizontal orientation of FIGS. 6 and 7, according to the orientation of the sheet on which the figures are drawn. Furthermore, due to this, each projection in FIG. 8 has two stitch lines.

The projection 880 has the stitch line 860A between Al/Bl and Ar/Br and a second stitch line 860B between Cl/Dl and Cr/Dr. Note that the stitch line still splits the faces A, B, C, and D. However, the faces A and B are now separated vertically from the faces C and D. In particular, the faces A and B are separated from the faces C and D by the face Fl and the mapped overlap portions of Dl', Bl', Dr', and Br'. As noted above, one or more of these faces and/or portions may be oriented differently (e.g., "upside-down" or rotated by 180 degrees) to increase the instances of visual continuity. Additionally, the face Er and the mapped overlap portions 840 of Cl', Al', Cr', and Ar' are arranged to be adjacent to the faces C and D as shown in the FIG. 8.

Projection 870 is similar to the projection 880, but with Al and Bl swapped with Ar and Br. This allows a visual continuity between Al, Fl, and Cl. As noted previously, visual continuity between portions of the projection 870 may assist in increasing encoding efficiency.

Figure 9:
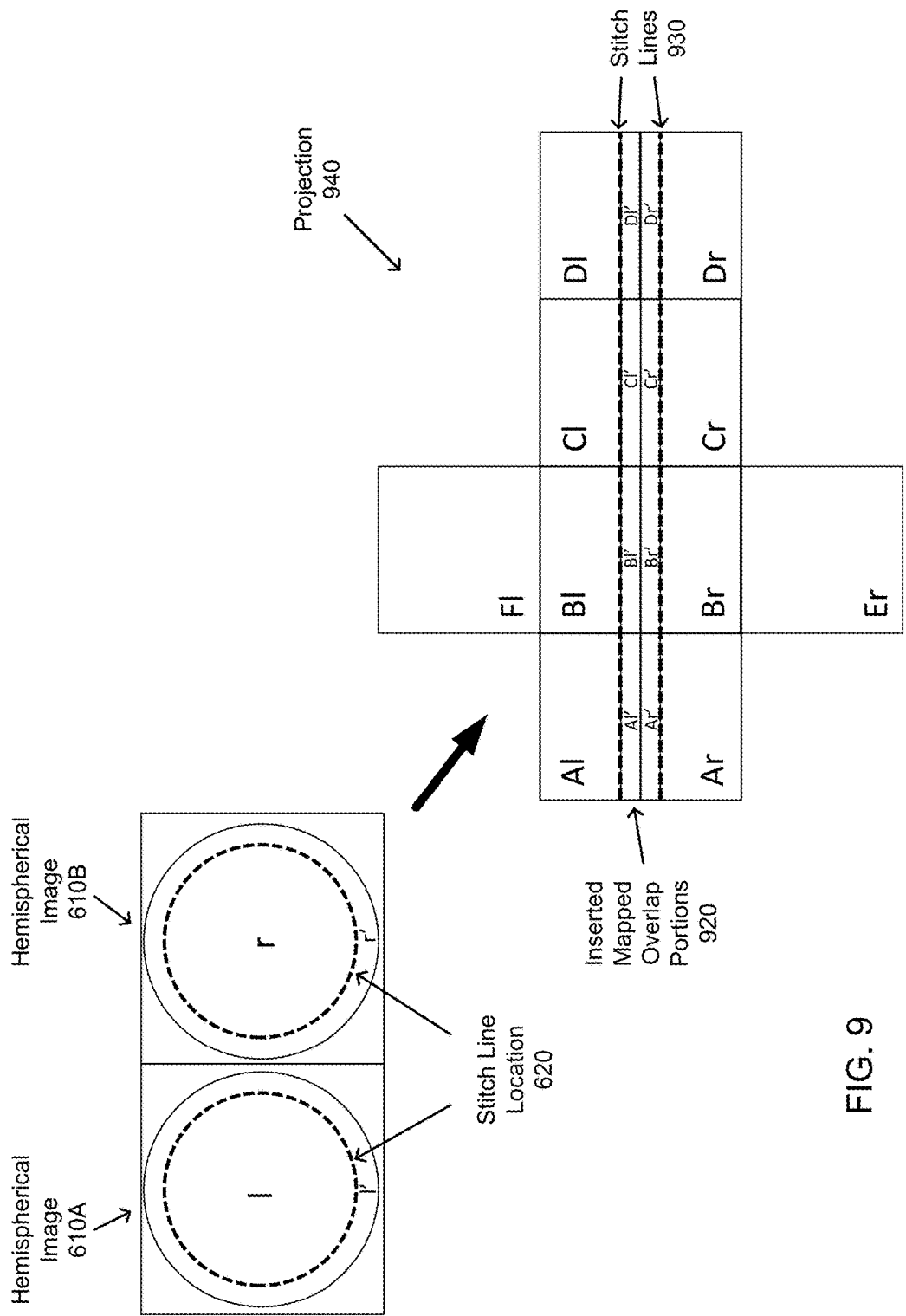
FIG. 9 illustrates additional exemplary mappings from two hemispherical camera images to different projections, according to one embodiment.

FIG. 9 illustrates additional exemplary mappings from two hemispherical camera images to different projections, according to one embodiment. FIG. 9 illustrates additional methods in addition to those shown in FIGS. 6-8 for mapping the hemispherical images 610 to various projection arrangements.

In contrast to the projections in FIGS. 6-8, in the projection 940 of FIG. 9, while similar to the projection 640 in FIG. 6, the mapping module 134 instead has the overlap portions inserted at the stitch line as the inserted mapped overlap portions 920. By inserting the overlap portions 920 in the original stitch line, two new stitch lines 930 are created, one stitch line bordering one edge of the inserted mapped overlap portions 920, and another stitch line bordering the other edge of the inserted mapped overlap portions 920 as shown in FIG. 9. In other words, the overlap portions are inserted between the two portions (i.e., two halves) of the projection 940 that were generated from each of the hemispherical images 610.

This allows a visual continuity between the overlap portions, e.g., Al' is visually continuous with Ar' and Bl' and between the portions of the faces and the overlap portions, e.g., between Al and Al'. Furthermore, although complete stitching of the inserted mapped overlap portions 920 may be performed outside of the cameras 110, in one embodiment, the camera 110, e.g., the pre-stitcher 250 of the camera 110, may perform a basic stitching of the inserted mapped overlap portions 920. This basic stitching may be an average of the pixel values in the overlap portions, a blur operation of the overlap portions, or some other power-efficient image manipulation.

Figure 10:
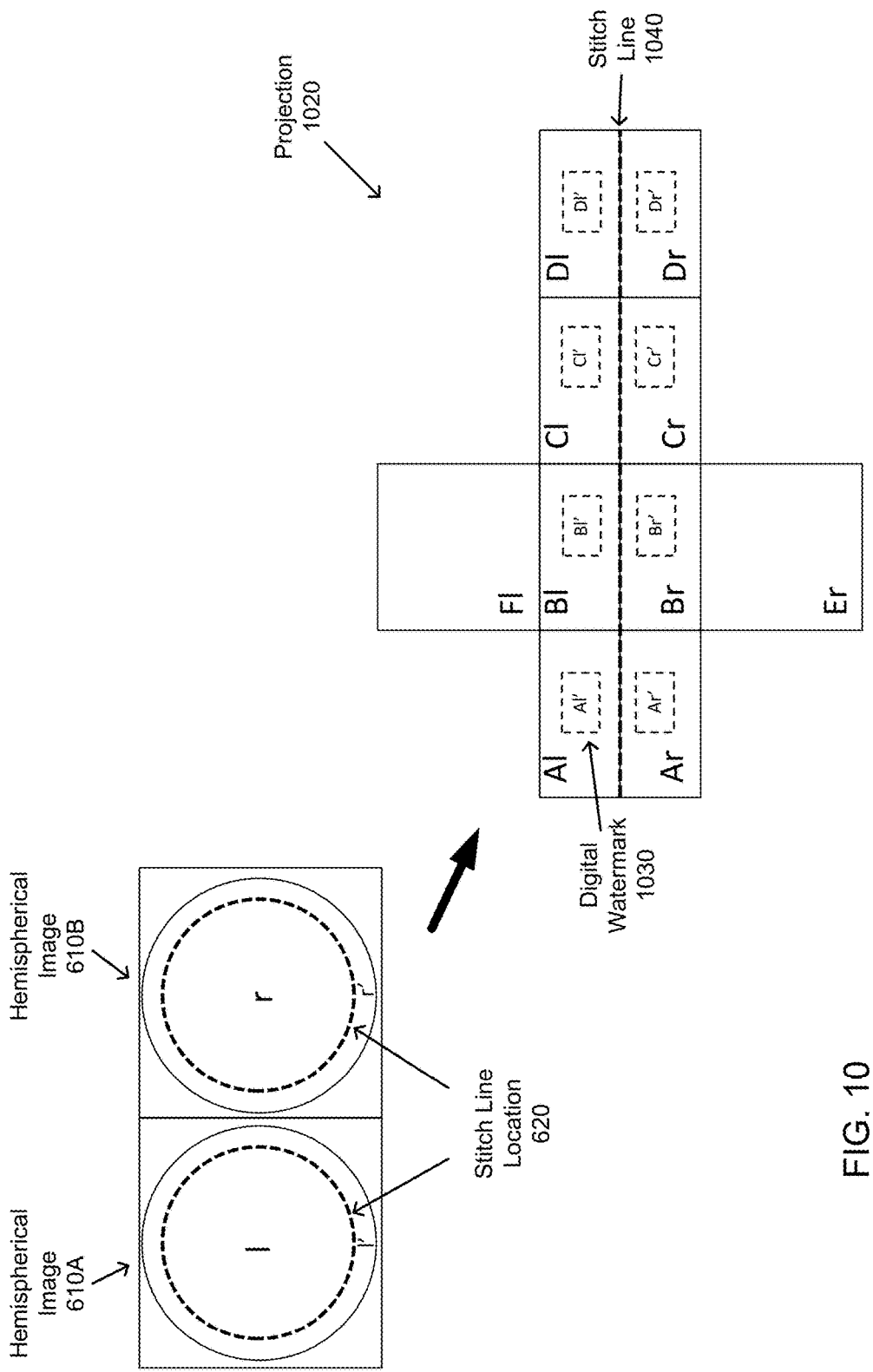
FIG. 10 illustrates additional exemplary mappings from two hemispherical camera images to different projections, according to one embodiment.

FIG. 10 illustrates additional exemplary mappings from two hemispherical camera images to different projections, according to one embodiment. FIG. 10 illustrates additional methods in addition to those shown in FIGS. 6-9 for mapping the hemispherical images 610 to various projection arrangements.

The projection 1020 of FIG. 10 illustrates a mapping, e.g., performed by the mapping module 134, that encodes the overlap portions as digital watermarks 1030. The digital watermarks 1030 are encoded into the image of the projection 1020 such that they are undetected if decoded using a system that is unaware of or not capable of decoding the digital watermarks 1030. Such an unaware system is also not affected by the digital watermark. On the other hand, a system that is aware of the digital watermarks and has the capability to extract them can extract the digital watermarks 1030 from the image of the projection 1020. The digital watermarks 1030 include the data needed to recreate the mapped overlap portions (like those described in earlier figures). These extracted mapped overlap portions may be used to generate a stitched image. In one embodiment, and as shown in FIG. 10, each portion of the projection 1020 encodes a digital watermark corresponding to an adjacent overlap portion. Thus, the portion Al has encoded within the digital watermark 1030 representing the overlap portion Al'. However, in other embodiments, the overlap portions are encoded throughout the image of the projection 1020, or are encoded in the image of the projection 1020 without any particular spatial relationship to the portions in the image. Furthermore, although a particular arrangement of the faces is shown here for digital watermarking, in other embodiments the faces in the projection may be arranged differently, e.g., in a 3×2 pattern, with the overlap portions encoded within the image as digital watermarks.

In one embodiment, the digital watermarking is achieved, e.g., by the mapping module 134, by encoding the pixel values of the mapped overlap portions within the bits (e.g., least significant bits) of the pixel values of the image of the projection 1020. If the encoding of the image uses a lossy process, the digital watermarking process may be performed at an intermediate step of the lossy encoding at a point where the lossy nature of the encoding does not remove the digital watermark due to the compression of the lossy encoding (e.g., in a JPEG image, encoding the overlap portion may occur immediately before the Huffman encoding step of the JPEG compression). Other methods such as redundant pattern encoding, spread spectrum encoding, or other encoding and image steganography techniques may be used.

Such an encoding process may allow for a more "backwards-compatible" image, with systems that are capable of extracting the digital watermark 1030 able to stitch the image using the overlap portions in the digital watermark, and systems that do not utilize stitching of the overlap portions ignoring the digital watermark 1030 altogether. It should be noted that the digital watermarks 1030 may not be visible when the images within the projection 1020 are displayed. It should also be noted that in some embodiments, instead of storing overlap portions of the hemispherical images 610 in a digital watermark, the overlap portions can be stored in image metadata, within headers or footers of image data, or in conjunction with image data in any other suitable way.

Exemplary Stitching Process

Figure 11:
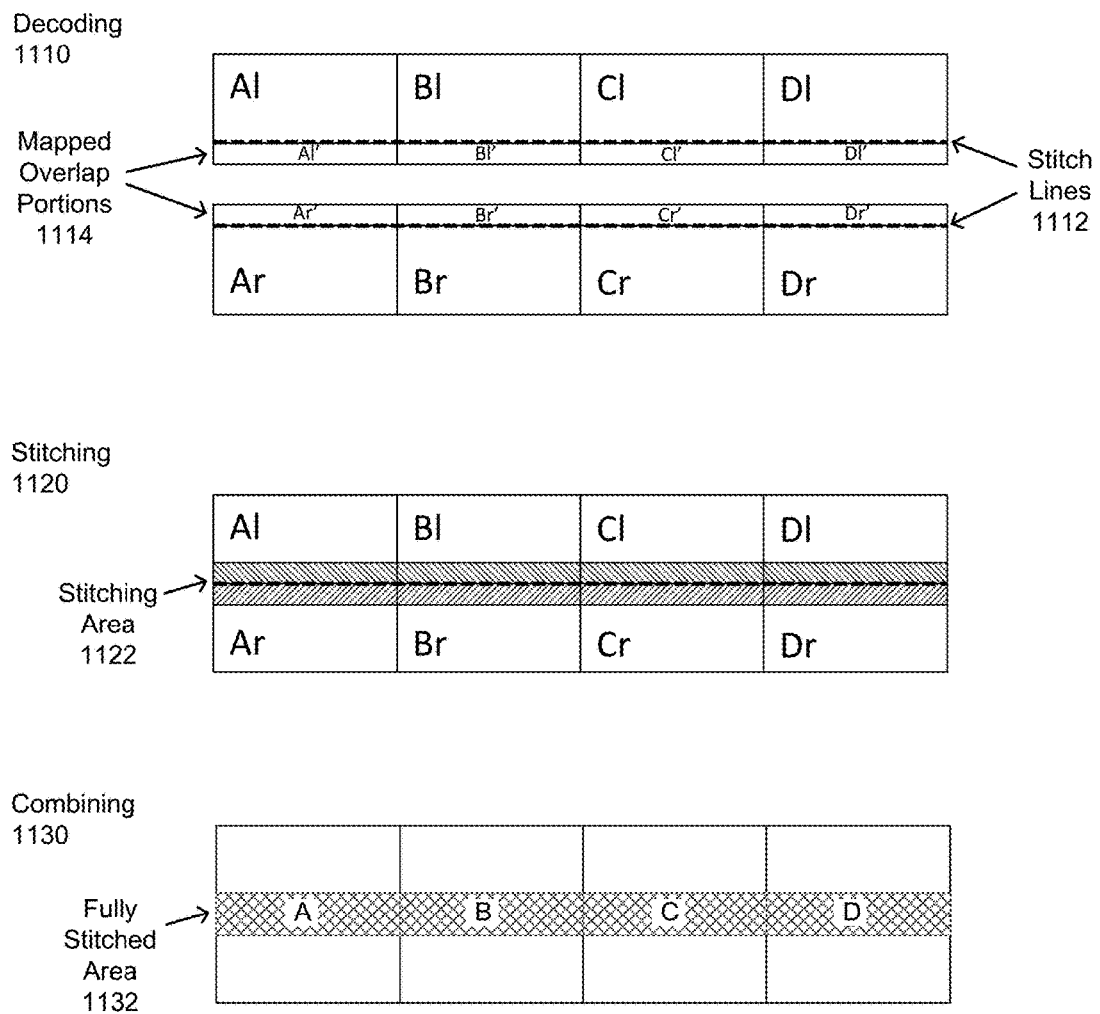
FIG. 11 illustrates an exemplary stitching process to stitch the overlap portions of a projection with the other portions of the projection to create a fully combined image, according to one embodiment.

FIG. 11 illustrates an exemplary stitching process to stitch the overlap portions of a projection with the other portions of the projection to create a fully combined image, according to one embodiment. The process may include the three (primary) operations of decoding 1110, stitching 1120, and combining 1130.

In the decoding 1110 operation, an encoded image is received that represents a projection of a cubic image representative of a spherical FOV. Examples of these projections are described above with reference to FIGS. 6-10. Although a particular set of projections are described herein, in other embodiments the projections may be arranged differently from the projections described herein, but are decoded in a similar fashion. The image may be encoded using various encoding schemes. If the image is a frame in a video, the encoding may be a video encoding scheme, such as H.264, MPEG-2, and so on. If the image is a single image, the encoding may be an image encoding scheme such as PNG, JPEG, BMP, Tiff, and so on. The image may have been encoded by the encoding module 138, which may be part of the hemispherical cameras 110. The image may be captured, mapped, and encoded by the hemispherical cameras 110, and then transmitted to the image processing system 130 for further stitching.

The decoding 1110 may be performed by the image processing system 130, e.g., by the I/O module 132 of the image processing system 130. The decoding 1110 may involve loading the data from the projection into memory, and using a decoding operation to convert the data into image data. The decoding method used depends upon the encoding format for the image (e.g., if the image were encoded using H. 264, then it would be decoded using a H. 264 decoder).

Note that depending upon the arrangement of the faces and overlap portions in the projections, and in particular depending upon the visual continuity of the portions, the encoded image data of the projections may be loaded more efficiently into memory, and this may improve the subsequent stitching performance. For example, if the overlap portions are arranged contiguously and furthermore if the data for the overlap portions are encoded contiguously, when loading these portions, the data for the overlap portions may be contiguous in memory as well. This allows the stitching process to read the data for these portions as contiguous sections of memory rather than having to access the data from various different locations in memory, which may improve the efficiency of the stitching process.

The image processing system 130 may identify the various portions of the projection in the encoded image during the decoding 1110 process. In particular, the image processing system 130 identifies the faces in the projection which are separated by a stitch line. These include the faces A, B, C, and D. The faces F and E (i.e., Fl and Er), being complete faces and not being separated by stitch lines (i.e., each created using image data from a single hemispherical camera 110), do not need any stitching and are not shown in the FIG. 11. The faces F and E may be decoded, but may not be further processed in the subsequent stitching process. The image processing system 130 also identifies the mapped overlap portions that are encoded in the image of the projection. In FIG. 11, the mapped overlap portions 1114 are shown as adjacent to the corresponding face portions (e.g., Al' is adjacent to Al), with the mapped overlap portions and the face portions divided by the stitch lines 1112.

The arrangement of the mapped overlap portions and the face portions are arranged as such to illustrate the stitching process, but in practice the image processing system 130 may not arrange the portions of the projection in such a fashion. Instead, the portions of the projection may be arranged differently. For example, the image processing system 130 may load the decoded portions into memory in the order in which the portions were encoded, and perform the subsequent stitching in-place in memory without any rearrangement.

The image processing system 130, e.g., the stitching module 136, performs a stitching of the mapped overlap portions 1114 as shown in the stitching 1120 operation to create fully stitched area from the overlap portions. In the stitching 1120 operation, the overlap portions are stitched using one or more stitching operations. Each overlap portion that was derived from one hemispherical camera is stitched with its complementary overlap portion having the same overlapping FOV.

In one embodiment, the image processing system 130 uses a depth-based stitching operation. In one embodiment, the depth-based stitching operation uses the overlapping portions to generate depth information. The depth information may be extracted by utilizing the parallax/stereo effect from capturing the overlap portion from the different hemispherical cameras 110. The depth information may be used to determine the location of objects in the captured scene by reconstructing the scene (e.g., in three dimensions) using the depth information. Using the reconstructed scene information and the location of objects in the scene, the depth-based stitching operation is able to more accurately stitch together the elements in the overlap portions to create a more seamless stitched image at the stitching area 1122.

For example, the image processing system 130 may generate a point cloud based on the overlap portions from the two hemispherical cameras 110. The image processing system 130 may use the point cloud information to identify various objects and other significant elements (e.g., those elements that have point cloud data that have values that are of a difference from the background average by a threshold value). The image processing system 130 identifies the corresponding objects and elements within the original overlap portions and aligns the overlapping portions using these identified objects and elements to create the fully stitched overlap area.

Other methods may also be used to stitch the overlap portions or to augment the depth-based stitching process described above. For example, various feature detectors, such as speeded up robust features (SIFT) may be used to detect features in the overlap portions. The features detected in each overlap portion captured by each hemispherical camera 110 may be matched in an image registration process, using various processes, e.g., random sample consensus (RANSAC). After image registration, calibration may be performed on the overlap portions to reduce differences in the overlap portions caused by the different lenses of the two hemispherical cameras 110. Additional alignment may also be performed to align the two overlap portions. A final blending based on the image registration and calibration information may be performed to fully stitch the overlap portions.

Once the stitching process is completed, the complete image is combined, e.g., by the image processing system 130, in a combining 1130 process. The separate portions of each face (e.g., Al and Ar), which were captured from the different hemispherical cameras 110, are combined with the fully stitched area 1132 to form a fully stitched projection of the cubic image representing the spherical FOV captured by the hemispherical cameras 110. By having the hemispherical cameras 110 capture these overlap portions, a more accurate stitching process may be employed that utilizes data from both overlap portions to generate a more accurate stitch. In one embodiment, the image processing system 130 may also perform a global warp on the entire set of faces A, B, C, and D, including the fully stitched area 1132 to correct for any remaining visual errors.

Exemplary Stitched Projections

Figure 12:
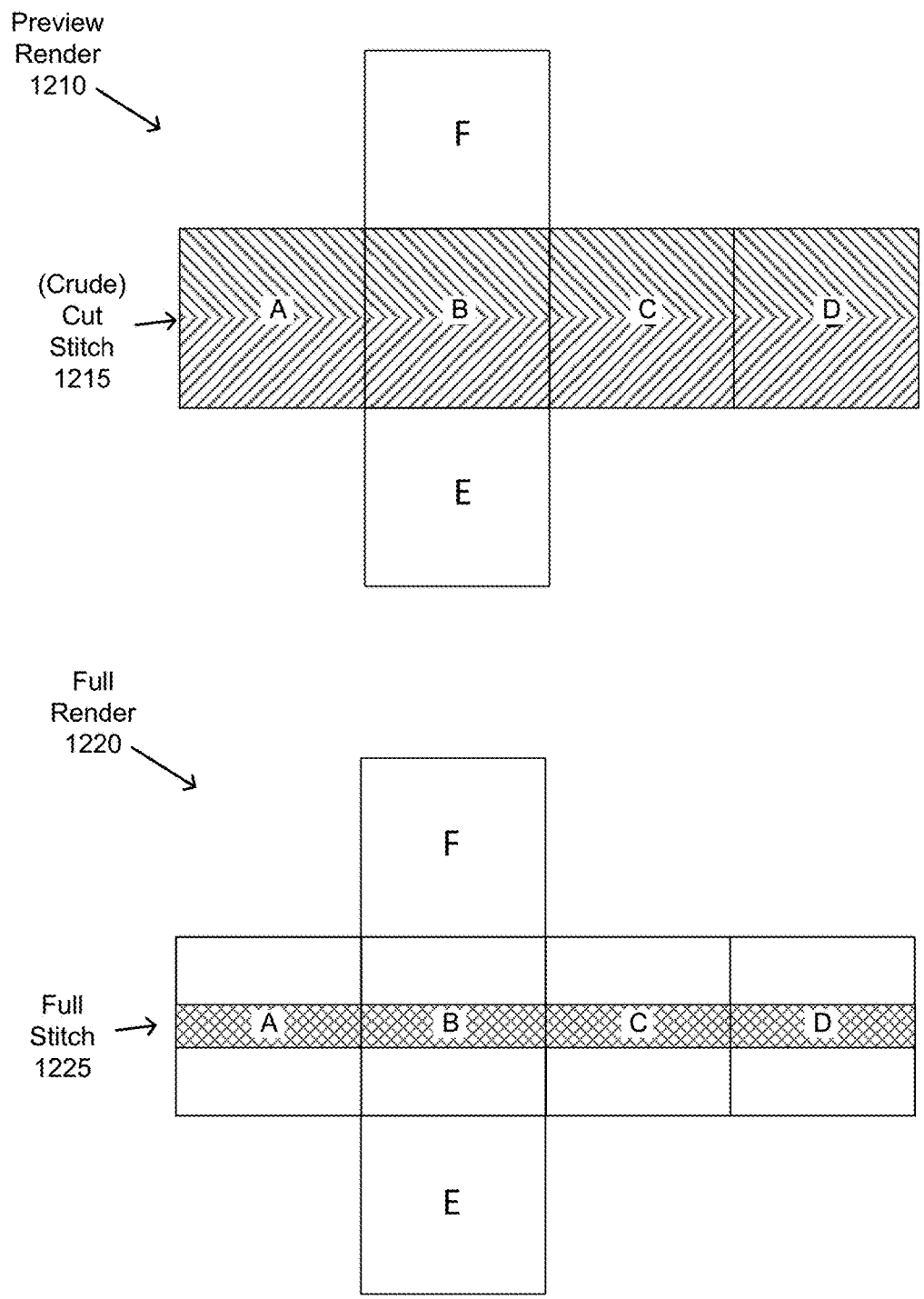
FIG. 12 illustrates an exemplary stitched projections that may be encoded for presentation to viewing users, according to one embodiment.

FIG. 12 illustrates exemplary stitched projections that may be encoded for presentation to viewing users, according to one embodiment. The exemplary stitched projections include a preview render 1210 and a full render 1220. These stitched projections are of the cubic image that represents the spherical FOV captured by the hemispherical cameras 110.

The preview render 1210 is a projection that includes a crude cut stitch 1215 without any significant stitching having been done. The preview render 1210 has the faces A, B, C, and D combined like in the combining operation 1130 of FIG. 11, however, the faces are not fully stitched together. Instead of being fully stitched together, the portions of each face, e.g., Al and Ar for face A, may simply be placed adjacent to each other, or a simple and crude stitch may be performed (e.g., by the pre-stitcher 250 on the camera 110). The different portions of each face, as captured by each of the different hemispherical cameras 110, are represented by the diagonal hash patterns in FIG. 12 which face different directions.

Such a preview render 1210, which may include some visual discontinuities at the cut stitch 1215, may be used as a preview on-camera or before stitching for a viewing user. For example, a viewing user may wish to view the captured images from the hemispherical cameras 110 on the camera. As the hemispherical camera 110 may not have stitched the images or may not have the processing power to stitch the images, the hemispherical camera 110 may instead present the preview render 1210 to the viewing user. As another example, the viewing user may be editing the captured images and may wish to see a preview of the captured images (e.g., which are part of a video) to determine which images to stitch together, and the preview render 1210 may be shown to the user at this time.

Note that although the preview render 1210 is shown as a projection of a cubic image here, when being presented to a viewing user, the preview render 1210 (and other renders) may be converted back, or mapped back, into a spherical image for presentation to the viewing user using a process that reverses the mapping of the spherical image to the cubic image of the projection.

In one embodiment, the hemispherical cameras 110 may have detected that one of the hemispherical camera 110 is obscured, e.g., the hemispherical cameras 110 may be mounted against a wall, or against a body. In such a case, the hemispherical cameras 110 may disable the presentation of one of the faces (i.e., F or E) representing the central portion of the hemispherical camera 110 that is obscured and only capture and render those faces that are not obscured.

In contrast to the preview render 1210, the full render 1220 includes the full stitch 1225. As described above with reference to FIG. 11, the full stitch 1225 may be created using the overlap portions and a stitching operation. This full render 1220 may be presented to a viewing user after being processed by the image processing system 130. This may occur in real-time as the images are being captured by the hemispherical cameras 110. For example, the image processing system 130 may be in a cloud (i.e., on a remote server) and may receive the images in real-time or near real time from the hemispherical cameras 110. Alternatively, the images may be transmitted by the hemispherical cameras 110 to the image processing system 130 in bulk, and the image processing system 130 may stitch the images together at a later time.

Figure 13:
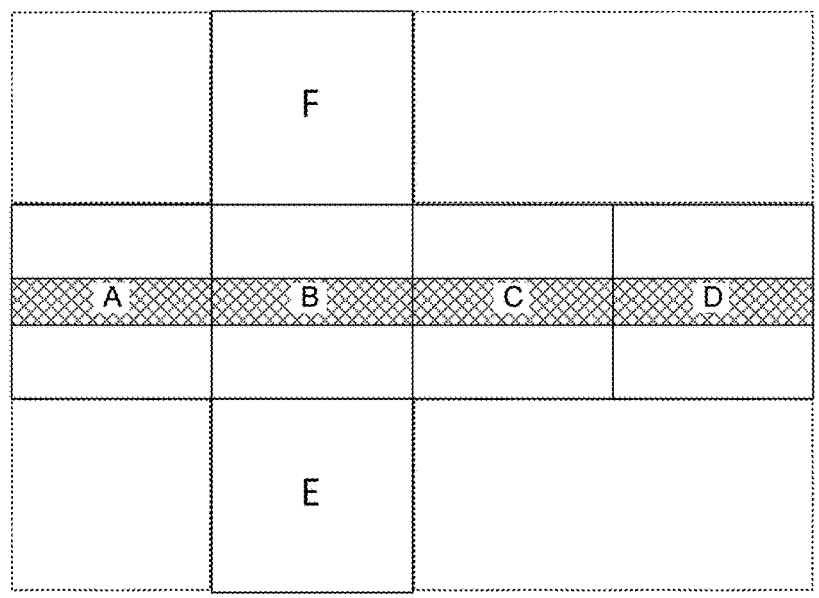
FIG. 13 illustrates additional exemplary stitched projections that may be encoded for presentation to viewing users, according to one embodiment.
Figure 13:
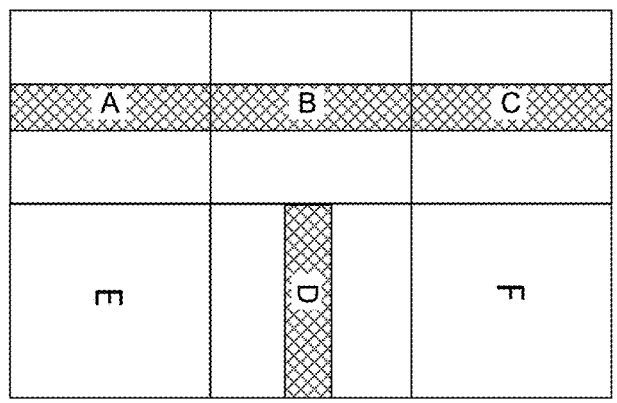

FIG. 13 illustrates additional exemplary stitched projections that may be encoded for presentation to a viewing user, according to one embodiment. In particular, the stitched projections may be encoded, e.g., by the encoding module 138 of the image processing system 130, according to various arrangements, such as the 4×3 render 1310 or the 3×2 render 1320 as illustrated in FIG. 13.

As illustrated in FIG. 13, the 4×3 render 1310 arranges the faces of the projection with the faces A, B, C, and D arranged in a row, and with the faces F and E arranged above and below the face B (according to the orientation of the sheet of the figure). This allows visual continuity for each face at least on one edge of each face. Note that in the encoding process, a blank, null, or empty filler image may be stored in the areas where no faces exist but which are bounded by a smallest rectangular boundary bounding the faces. These filler images are indicated by the dotted lines in FIG. 13.

In contrast, the 3×2 render 1320 arranges the faces with faces A, B, and C in one "row" and the faces E, D, and F arranged on a second "row." Note that the faces E, D, and F are oriented differently (e.g., rotated by 90 degrees) to achieve visual continuity along these faces. The arrangement of the faces in the 3×2 render 1320 presents a rectangular image compared to the 4×3 render 1310, which presents a non-rectangular shape. This may improve encoding efficiency, as the encoding process (e.g., via the encoding module 138) may perform better with a rectangular image. However, with the 3×2 render 1320 arrangement, there are fewer regions of visual continuity compared to the 4×3 render 1310. Furthermore, there are areas of visual disjoint, e.g., where face A meets face E. In this visually disjoint areas, the encoding process may create further artifacts. This may decrease the encoding efficiency and decrease image quality after encoding (i.e., compression). Thus, in one embodiment, the encoding module 138 may encode the stitched images by utilizing both the 4×3 render 1310 arrangement and the 3×2 render 1320 arrangement depending upon which arrangement produces the most efficient encoding efficiency or preserves the most quality in the encoded image.

Note that both the 4×3 render 1310 and 3×2 render 1320 may be stored as a standard two dimensional image (e.g., in a standard image format such as JPEG), with dimensions corresponding to the width and height of the faces.

Exemplary Flows

Figure 14:
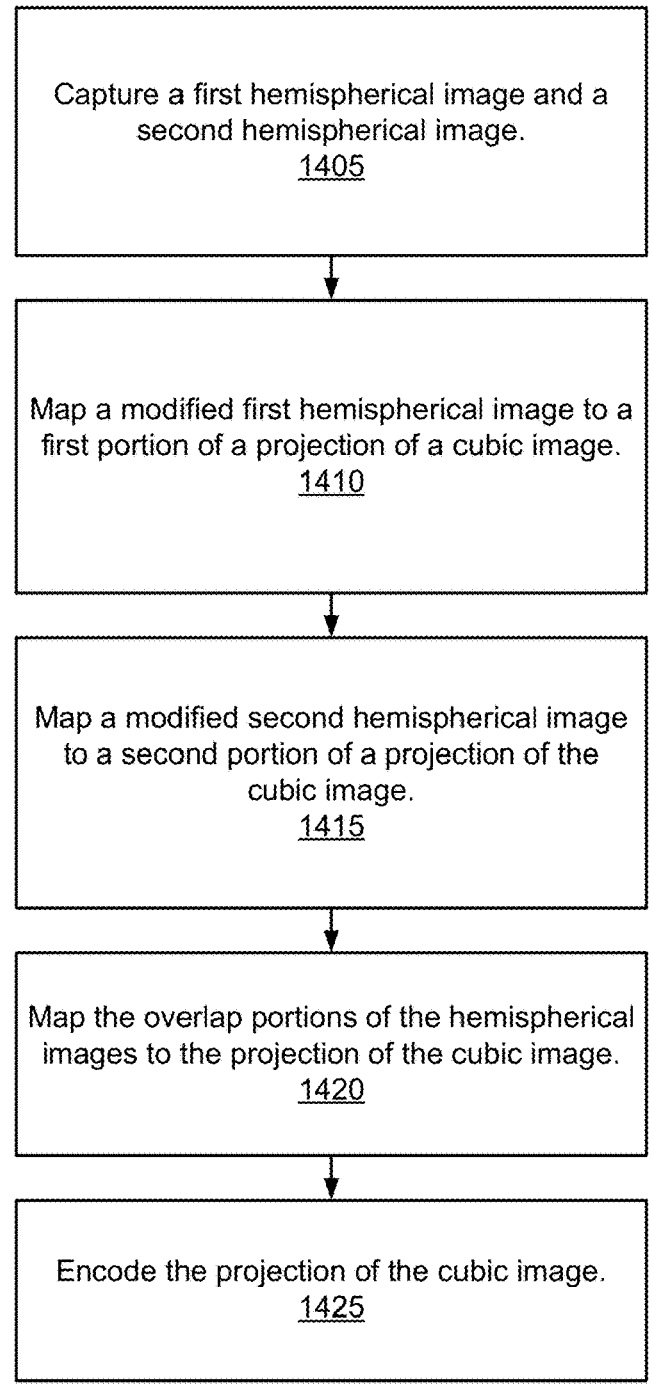
FIG. 14 illustrates a flow to map the captured images from the hemispherical cameras to a projection of a cubic image representing the spherical FOV captured by the hemispherical cameras, according to an embodiment.

FIG. 14 is a flow chart illustrating a process of mapping captured images from hemispherical cameras to a projection of a cubic image representing the spherical FOV captured by the hemispherical cameras, according to an embodiment. In one embodiment, the operations in the embodiment of FIG. 14 are performed by the image processing system 130, e.g., input/output module 138, the mapping module 134, and the encoding module 138 of the image processing system 130.

Initially, the image processing system 130 captures 1405 a first hemispherical image and a second hemispherical image. Each hemispherical image includes an overlap portion. These overlap portions capture a same field of view. The two hemispherical images together comprise a spherical FOV separated along a longitudinal plane. In one embodiment, these are the images captured by the hemispherical cameras 110.

The image processing system 130 maps 1410 a modified first hemispherical image to a first portion of a projection of a cubic image. The modified first hemispherical image includes the non-overlap portion of the first hemispherical image. The cubic image comprises a representation of the spherical FOV.

The image processing system 130 maps 1415 a modified second hemispherical image to a second portion of a projection of the cubic image. The modified second hemispherical image includes the non-overlap portion of the second hemispherical image. In one embodiment, the non-overlap portions of the hemispherical images are mapped to the projection according to the methods described above. For example, the non-overlap portions may be mapped by converting the spherical image captured from the hemispherical cameras 110 into a cubic image, and generating a 2D projection of the cubic image with the faces A, B, C, and D of the cubic image placed in a row, and with the faces F and E placed above and below face B, respectively (e.g., as shown in FIG. 5).

The image processing system 130 maps 1420 the overlap portions of the first hemispherical image and the second hemispherical image to the 2D projection of the cubic image. In one embodiment, the overlap portions are mapped to the 2D projection as the mapped overlap portions described above. For example, the overlap portions may be mapped from the spherical image to a cubic image representation of the spherical image, and placed alongside the F face in a 2D projection of the cubic image.

The image processing system 130 encodes 1425 the 2D projection of the cubic image to generate an encoded image representative of the spherical FOV. This encoding may be using various video and/or still image encoding operations. If the image of the 2D projection is non-rectangular, additional uniform pixel values may be inserted into the blank areas of the 2D projection. Additional encoding methods have been described above.

Figure 15:
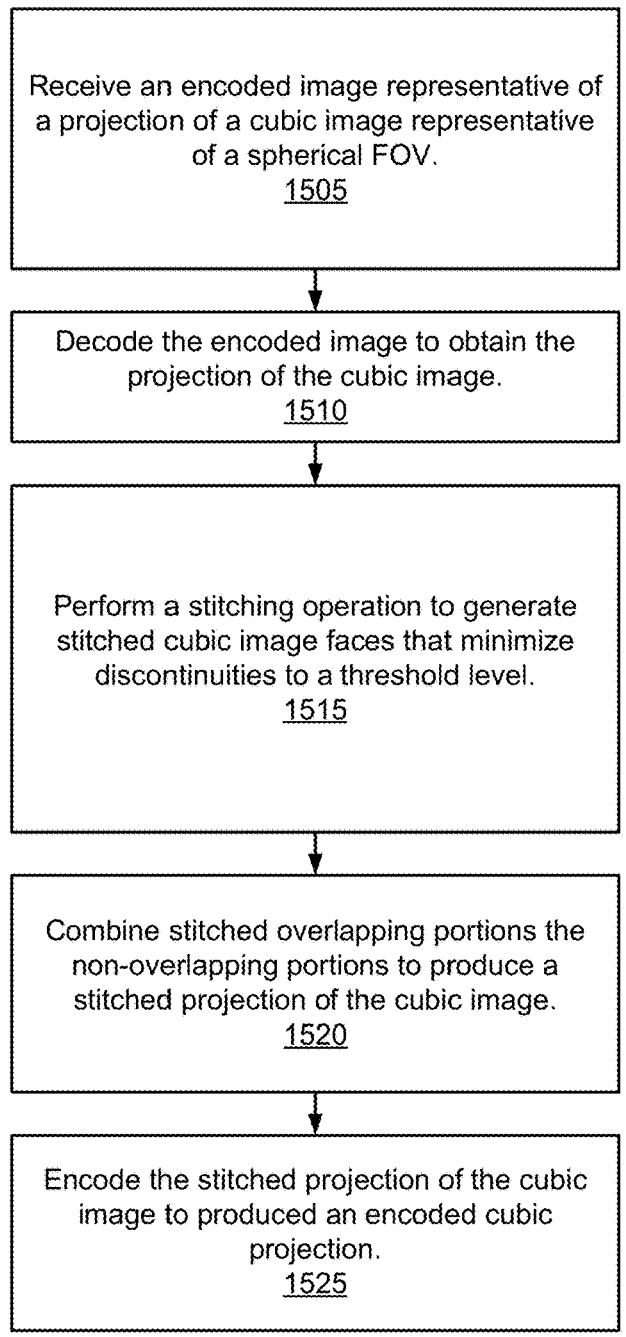
FIG. 15 illustrates a flow to stitch the portions of the projection of the cubic image produced by the mapping process, according to an embodiment.

FIG. 15 is a flow chart illustrating a process for stitching the portions of a 2D projection of a cubic image, according to an embodiment. In one embodiment, the operations in the flow described here are performed by the image processing system 130, e.g., the stitching module 136 and the encoding module 138 of the image processing system 130.

Initially, the image processing system 130 receives 1505 an encoded image representative of a 2D projection of a cubic image representative of a spherical FOV. The encoded image is generated from two overlapping hemispherical images separated along a longitudinal plane of a sphere. The encoded image may be the encoded image produced in the flow for FIG. 14.

The image processing system 130 decodes 1510 the encoded image to obtain the 2D projection of the cubic image. The decoding of the encoded image may depend upon the encoding format of the encoded image. For example, if the image was encoded using JPEG, then the image would be decoded using a JEPG decoding process.

The image processing system 130 performs 1515 a stitching operation. The stitching operation is performed on portions of the 2D projection representative of overlapping portions of the hemispherical images to produce stitched overlapping portions. The stitching of the overlapping portions may be performed similarly to the operations described above with reference to FIG. 12, e.g., a depth-based stitching process may be used.

The image processing system 130 combines 1520 the stitched overlapping portions with portions of the 2D projection representative of the non-overlapping portions of the hemispherical images to produce a stitched 2D projection of the cubic image. The stitched overlapping portion matches portions of the non-overlapping portions of the projection. These are combined together to create the final projection.

The image processing system encodes 1525 the stitched 2D projection of the cubic image to produce an encoded cubic projection of the stitched hemispherical images. The encoding may used the same encoding format used to encode the original encoded image.

In one embodiment, the encoded cubic projection may be converted back into a spherical image using a process that is the reverse of the process described above. The spherical image may be presented to a viewing user using a capable display device, such as a virtual reality headset.

Additional Configuration Considerations

Certain embodiments are described herein as including logic or a number of components, modules, or mechanisms, for example, as illustrated in FIGS. 2 and 3. Modules may constitute either software modules (e.g., code embodied on a machine-readable medium or in a transmission signal) or hardware modules. A hardware module is tangible unit capabAle of performing certain operations and may be configured or arranged in a certain manner. In example embodiments, one or more computer systems (e.g., a stand-alone, client or server computer system) or one or more hardware modules of a computer system (e.g., a processor or a group of processors) may be configured by software (e.g., an application or application portion) as a hardware module that operates to perform certain operations as described herein.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context. Further, unless expressly stated to the contrary, "or" refers to an inclusive or and not to an exclusive or.

Upon reading this disclosure, those of skill in the art will appreciate still additional alternative structural and functional designs for a system and a process for processing image data through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A method for mapping spherical images to a 2D projection of a cubic representation of a spherical field of view (FOV) comprising:
 capturing a first hemispherical image and a second hemispherical image, each of the first hemispherical image and the second hemispherical image including an overlap portion, the overlap portions capturing a same field of view, the first and second hemispherical images collectively comprising a spherical FOV and separated along a longitudinal plane;
 mapping a modified first hemispherical image to a first portion of the 2D projection of a cubic image, the modified first hemispherical image including a non-overlap portion of the first hemispherical image, wherein the mapping of the modified first hemispherical image to the first portion of the 2D projection comprises:
  warping the modified first hemispherical image into a first square image;
  extracting a first central portion from the first square image, the first central portion being a square image;
  dividing a remainder of the first square image into four remaining portions of the first square image, the four remaining portions of the first square image having equal size;
  mapping the first central portion to a first face of the 2D projection of the cubic image; and
  mapping each of the four remaining portions of the first square image to one half of each of a set of four faces of the 2D projection of the cubic image, the set of four faces of the 2D projection of the cubic image including a second, third, fourth, and fifth face of the 2D projection of the cubic image;
 mapping a modified second hemispherical image to a second portion of the 2D projection of the cubic image, the modified second hemispherical image including a non-overlap portion of the second hemispherical image;
 mapping the overlap portions of the first hemispherical image and the second hemispherical image to the 2D projection of the cubic image; and
 encoding the 2D projection of the cubic image to generate an encoded image representative of the spherical FOV.

2. The method of claim 1, wherein the capturing of the first hemispherical image comprises capturing the first hemispherical image using a first hemispherical camera with a hyper-hemispherical FOV in a first direction, and the capturing of the second hemispherical image comprises capturing the second hemispherical image using a second hemispherical camera with the hyper-hemispherical FOV in a second direction, the second direction being substantially opposite to the first direction.

3. The method of claim 1, wherein the mapping of the modified second hemispherical image further comprises:
 warping the modified second hemispherical image into a second square image;
 extracting a second central portion from the second square image, the second central portion being a square image;
 dividing the remainder of the second square image into four remaining portions of the second square image, the four remaining portions of the second square image having equal size;
 mapping the second central portion to a sixth face of the 2D projection of the cubic image; and
 mapping each of the four remaining portions of the second square image to a second half of each of the set of four faces of the 2D projection of the cubic image, each of the four remaining portions of the second square image mapped to one of the set of four faces of the 2D projection of the cubic image on which a remaining portion of the first square image representing an adjacent FOV is mapped.

4. The method of claim 3, wherein the mapping of the overlap portions of the first hemispherical image and the second hemispherical image to the 2D projection of the cubic image further comprises:
 warping the overlap portions of the first hemispherical image and the second hemispherical image into rectangular images;
 mapping each of the warped overlap portions of the first hemispherical image and the second hemispherical image to an additional portion of the 2D projection of the cubic image.

5. The method of claim 4, wherein two or more of the additional portion of the 2D projection of the cubic image are arranged adjacent to each other in the 2D projection of the cubic image.

6. The method of claim 4, wherein the set of four faces of the 2D projection of the cubic image are arranged laterally adjacent to each other, and wherein a corresponding additional portion of the 2D projection of the cubic image is inserted between two halves of each face of the set of four faces, each of the set of four faces representing a FOV that overlaps the FOV represented by the corresponding additional portion.

7. The method of claim 4, wherein the faces of the 2D projection of the cubic image and the additional portion of the 2D projection of the cubic image are arranged to completely fill a rectangular bounding box.

8. The method of claim 7, wherein at least one of the faces of the 2D projection of the cubic image is arranged adjacent to another face of the 2D projection of the cubic image such that the two faces represent adjacent FOVs of the original spherical FOV.

9. The method of claim 3, wherein the mapping of the overlap portions of the first hemispherical image and the second hemispherical image to the 2D projection of the cubic image further comprises:
 warping the overlap portions of the first hemispherical image and the second hemispherical image into rectangular images; and
 encoding each of the warped overlap portions of the first hemispherical image and the second hemispherical image as a digital watermark in a corresponding face of the 2D projection of the cubic image.

10. A hardware system for mapping spherical images to a projection of a cubic representation of a spherical field of view (FOV) configured to:
 capture a first hemispherical image and a second hemispherical image, each of the first hemispherical image and the second hemispherical image including an overlap portion, the overlap portion capturing a same field of view, the first and second hemispherical images collectively comprising a spherical FOV and separated along a longitudinal plane;
 map a modified first hemispherical image to a first portion of the 2D projection of a cubic image, the modified first hemispherical image including a non-overlap portion of the first hemispherical image;

warp the modified first hemispherical image into a first square image;

extract a first central portion from the first square image, the first central portion being a square image;

divide a remainder of the first square image into four remaining portions of the first square image, the four remaining portions of the first square image having equal size;

map the first central portion to a first face of the 2D projection of the cubic image; and map each of the four remaining portions of the first square image to one half of each of a set of four faces of the 2D projection of the cubic image, the set of four faces of the 2D projection of the cubic image including a second, third, fourth, and fifth face of the 2D projection of the cubic image;

map a modified second hemispherical image to a second portion of the 2D projection of the cubic image, the modified second hemispherical image including a non-overlap portion of the second hemispherical image;

map the overlap portion of the first hemispherical image and the second hemispherical image to the 2D projection of the cubic image; and encode the 2D projection of the cubic image to generate an encoded image representative of the spherical FOV.

11. The system of claim 10, wherein the first hemispherical image is captured by a first hemispherical camera with a hyper-hemispherical FOV, wherein the second hemispherical image is captured by a second hemispherical image with the hyper-hemispherical FOV, and wherein the first hemispherical camera is structurally fixed at a substantially opposite direction to a direction of the second hemispherical camera.

12. The system of claim 10, wherein the system is further configured to:

warp the modified second hemispherical image into a second square image;

extract a second central portion from the second square image, the second central portion being a square image;

divide the remainder of the second square image into four remaining portions of the second square image, the four remaining portions of the second square image having equal size;

map the second central portion to a sixth face of the 2D projection of the cubic image; and map each of the four remaining portions of the second square image to a second half of each of the set of four faces of the 2D projection of the cubic image, each of the four remaining portions of the second square image mapped to one of the set of four faces of the 2D projection of the cubic image on which a remaining portion of the first square image representing an adjacent FOV is mapped.

13. The system of claim 12, wherein the system is further configured to:

warp the overlap portion of the first hemispherical image and the second hemispherical image into rectangular images;

warp each of the warped overlap portions of the first hemispherical image and the second hemispherical image to an additional portion of the 2D projection of the cubic image.

14. The system of claim 13, wherein two or more of the additional portion of the 2D projection of the cubic image are arranged adjacent to each other in the 2D projection of the cubic image.

15. The system of claim 13, wherein the set of four faces of the 2D projection of the cubic image are arranged laterally adjacent to each other, and wherein a corresponding additional portion of the 2D projection of the cubic image is inserted between two halves of each face of the set of four faces, each of the set of four faces representing a FOV that overlaps the FOV represented by the corresponding additional portion.

16. The system of claim 13, wherein faces of the 2D projection of the cubic image and the additional portion of the 2D projection of the cubic image are arranged to completely fill a rectangular bounding box.

17. The system of claim 16, wherein at least one of the faces of the 2D projection of the cubic image is arranged adjacent to another face of the 2D projection of the cubic image such that the two faces represent adjacent FOVs of the original spherical FOV.

18. The system of claim 12, wherein the system is further configured to:

warp the overlap portions of the first hemispherical image and the second hemispherical image into rectangular images; and encode each of the warped overlap portions of the first hemispherical image and the second hemispherical image as a digital watermark in a corresponding face of the 2D projection of the cubic image.

19. A non-transitory computer readable apparatus comprising a storage medium having computer-readable instructions, the computer-readable instructions which when executed, are configured to:

receive a first hemispherical image and a second hemispherical image, each of the first hemispherical image and the second hemispherical image including an overlap portion, the overlap portion capturing a same field of view, the first and second hemispherical images collectively comprising a spherical field of view (FOV) and separated along a longitudinal plane;

map a modified first hemispherical image to a first portion of the 2D projection of a cubic image, the modified first hemispherical image including a non-overlap portion of the first hemispherical image;

warp the modified first hemispherical image into a first square image;

extract a first central portion from the first square image, the first central portion being a square image;

divide a remainder of the first square image into four remaining portions of the first square image, the four remaining portions of the first square image having equal size;

map the first central portion to a first face of the 2D projection of the cubic image; and map each of the four remaining portions of the first square image to one half of each of a set of four faces of the 2D projection of the cubic image, the set of four faces of the 2D projection of the cubic image including a second, third, fourth, and fifth face of the 2D projection of the cubic image;

map a modified second hemispherical image to a second portion of the 2D projection of the cubic image, the modified second hemispherical image including a non-overlap portion of the second hemispherical image;

map the overlap portion of the first hemispherical image and the second hemispherical image to the 2D projection of the cubic image; and encode the 2D projection of the cubic image to generate an encoded image representative of the spherical FOV.

20. The non-transitory computer readable apparatus of claim 19, wherein the computer-readable instructions, which when executed, are further configured to:
- warp the modified second hemispherical image into a second square image;
- extract a second central portion from the second square image, the second central portion being a square image;
- divide the remainder of the second square image into four remaining portions of the second square image, the four remaining portions of the second square image having equal size;
- map the second central portion to a sixth face of the 2D projection of the cubic image; and
- map each of the four remaining portions of the second square image to a second half of each of the set of four faces of the 2D projection of the cubic image, each of the four remaining portions of the second square image mapped to one of the set of four faces of the 2D projection of the cubic image on which a remaining portion of the first square image representing an adjacent FOV is mapped.

* * * * *